United States Patent
Takahashi et al.

(10) Patent No.: US 10,402,296 B2
(45) Date of Patent: Sep. 3, 2019

(54) MONITOR CONTROL SYSTEM AND DATA COLLECTION APPARATUS

(71) Applicants: KABUSHIKI KAISHA TOSHIBA, Minato-ku (JP); TOSHIBA SOLUTIONS CORPORATION, Kawasaki-shi (JP)

(72) Inventors: Kazuaki Takahashi, Kunitachi (JP); Takehiro Yoshimoto, Machida (JP); Nobuyuki Fukushima, Kawasaki (JP); Masumi Inaba, Fuchu (JP); Hiroyuki Oikawa, Inagi (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 140 days.

(21) Appl. No.: 15/301,174

(22) PCT Filed: Aug. 26, 2015

(86) PCT No.: PCT/JP2015/004287
§ 371 (c)(1),
(2) Date: Sep. 30, 2016

(87) PCT Pub. No.: WO2016/031244
PCT Pub. Date: Mar. 3, 2016

(65) Prior Publication Data
US 2017/0017560 A1   Jan. 19, 2017

(30) Foreign Application Priority Data
Aug. 27, 2014  (JP) ................................. 2014-173312

(51) Int. Cl.
*G05B 13/02*     (2006.01)
*G06F 11/34*     (2006.01)
(Continued)

(52) U.S. Cl.
CPC ...... *G06F 11/3072* (2013.01); *G05B 13/0265* (2013.01); *G05B 23/0221* (2013.01);
(Continued)

(58) Field of Classification Search
None
See application file for complete search history.

(56) References Cited

U.S. PATENT DOCUMENTS 6,237,114 B1 * 5/2001 Wookey ............. G06F 11/0748
714/47.2
6,421,571 B1 * 7/2002 Spriggs ................. G05B 15/02
345/629
(Continued)

FOREIGN PATENT DOCUMENTS

JP   2000-172333 A   6/2000
JP   2002-207513 A   7/2002
(Continued)

OTHER PUBLICATIONS

ATLAS High-Level Trigger, Data Acquisition and Controls, Technical Design Report, XP002570453, Jul. 3, 2003, 195 pages.
(Continued)

*Primary Examiner* — Isaac T Tecklu
(74) *Attorney, Agent, or Firm* — Oblon, McClelland, Maier & Neustadt, L.L.P.

(57) ABSTRACT

A data collection apparatus includes a data collection section configured to receive sequential time-series output data pieces for each of data sources, a data shaping section configured to perform data shaping processing on the sequential time-series output data pieces based on a predetermined data shaping rule set for each of the data sources such that the resulting data pieces are reduced in number or in data amount as compared with the output data pieces output from the data source, a data transmission section
(Continued)

configured to transmit the output data pieces to the monitor control apparatus, and a data shaping rule control section configured to receive the data shaping rule set for each of the data sources from the monitor control apparatus and to set the received data shaping rule in the data shaping section.

9 Claims, 22 Drawing Sheets

(51) Int. Cl.
G06F 11/30 (2006.01)
G06F 13/00 (2006.01)
G05B 23/02 (2006.01)

(52) U.S. Cl.
CPC ..... *G05B 23/0264* (2013.01); *G05B 23/0278* (2013.01); *G06F 11/3006* (2013.01); *G06F 11/3495* (2013.01); *G06F 13/00* (2013.01)

(56) References Cited

U.S. PATENT DOCUMENTS

| | | | | |
|---|---|---|---|---|
| 6,985,901 | B1* | 1/2006 | Sachse | H04L 41/5032 |
| 7,254,750 | B1* | 8/2007 | Okun | G06F 11/3452 |
| | | | | 714/47.2 |
| 2002/0183972 | A1* | 12/2002 | Enck | G06F 11/3409 |
| | | | | 702/186 |
| 2003/0023518 | A1 | 1/2003 | Spriggs et al. | |
| 2003/0028269 | A1 | 2/2003 | Spriggs et al. | |
| 2003/0110249 | A1* | 6/2003 | Buus | G06Q 30/02 |
| | | | | 709/224 |
| 2003/0135382 | A1* | 7/2003 | Marejka | G06F 11/0709 |
| | | | | 709/232 |
| 2008/0016412 | A1* | 1/2008 | White | G06F 11/3409 |
| | | | | 714/48 |
| 2008/0097725 | A1* | 4/2008 | Knodle | G05B 23/0221 |
| | | | | 702/188 |
| 2009/0198385 | A1* | 8/2009 | Oe | G06F 1/28 |
| | | | | 700/296 |
| 2011/0160923 | A1* | 6/2011 | Vetter | G06F 1/28 |
| | | | | 700/286 |
| 2012/0066384 | A1* | 3/2012 | Hatanaka | H04L 12/2823 |
| | | | | 709/224 |
| 2013/0179124 | A1* | 7/2013 | Patel | G01R 31/2825 |
| | | | | 702/190 |

FOREIGN PATENT DOCUMENTS

| | | |
|---|---|---|
| JP | 2003-525489 A | 8/2003 |
| JP | 2012-194806 A | 10/2012 |
| JP | 2014-32657 A | 2/2014 |
| WO | WO 01/65322 A1 | 9/2001 |

OTHER PUBLICATIONS

International Search Report dated Oct. 13, 2015 in PCT/JP2015/004287, filed Aug. 26, 2015.

* cited by examiner

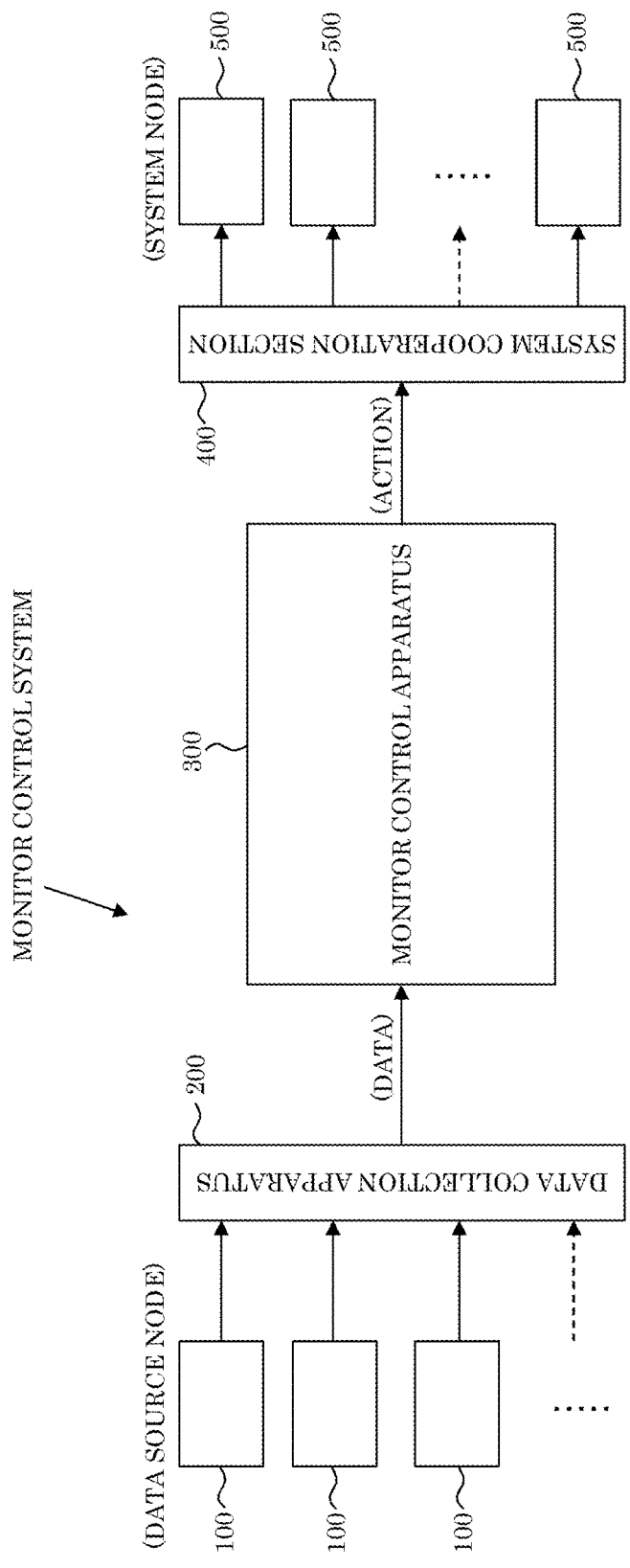

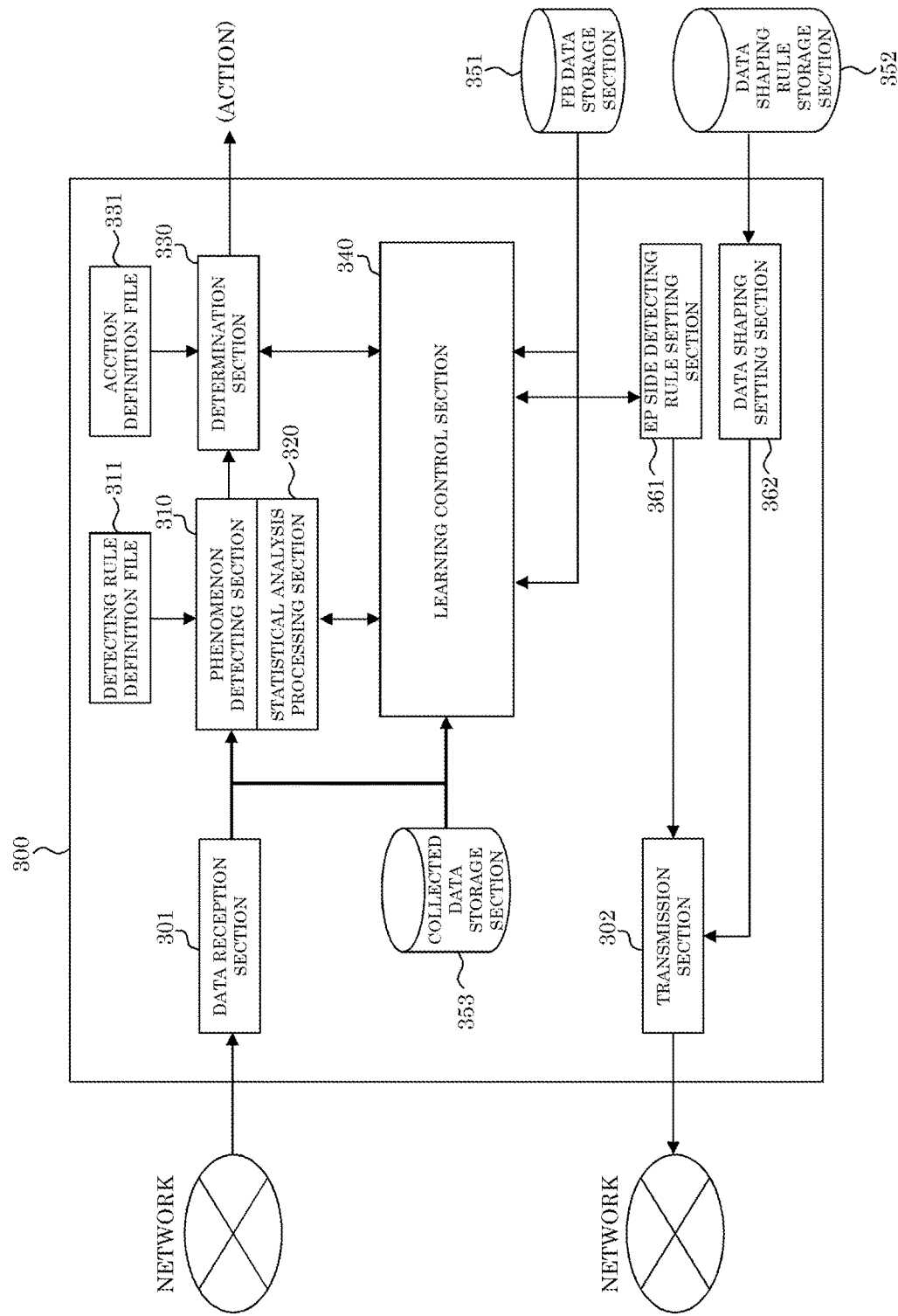
[FIG 2]

[FIG 3]

(OUTPUT DATA FROM DATA SOURCE NODE)

| APPARATUS ID | RESOURCE INFORMATION | CPU UTILIZATION RATE | MEMORY USE AMOUNT | DATA TYPE | | |
| --- | --- | --- | --- | --- | --- | --- |
| | | | | REMAINING STORAGE AREA | TRAFFIC AMOUNT | OPERATIONAL TIME |
| A001 | WEB SERVER | 80% | High | 80% | 1000 | Long |
| A002 | DB SERVER | 60% | High | 60% | 2000 | Short |
| A003 | DB SERVER | 50% | Low | 50% | 5000 | Long |
| A004 | PROXY SERVER | 5% | Medium | 5% | 3000 | Short |
| A005 | WEB SERVER | 10% | Low | 90% | 4000 | Short |

[FIG 4]

(EXAMPLE OF SEQUENTIAL TIME-SERIES OUTPUT DATA WITH APPARATUS ID "A001")

| APPARATUS ID | RESOURCE INFORMATION | DATA TYPE | | | | |
|---|---|---|---|---|---|---|
| | | CPU UTILIZATION RATE | MEMORY USE AMOUNT | REMAINING STORAGE AREA | TRAFFIC AMOUNT | OPERATIONAL TIME |
| A001 | WEB SERVER | 80% | High | 80% | 1000 | Long |
| A001 | WEB SERVER | 85% | High | 80% | 1000 | Long |
| A001 | WEB SERVER | 90% | High | 80% | 1000 | Long |
| A001 | WEB SERVER | 93% | High | 80% | 1000 | Long |
| A001 | WEB SERVER | ... | ... | ... | ... | ... |

TIME-SERIES (INPUT) ORDER →

[FIG 5]
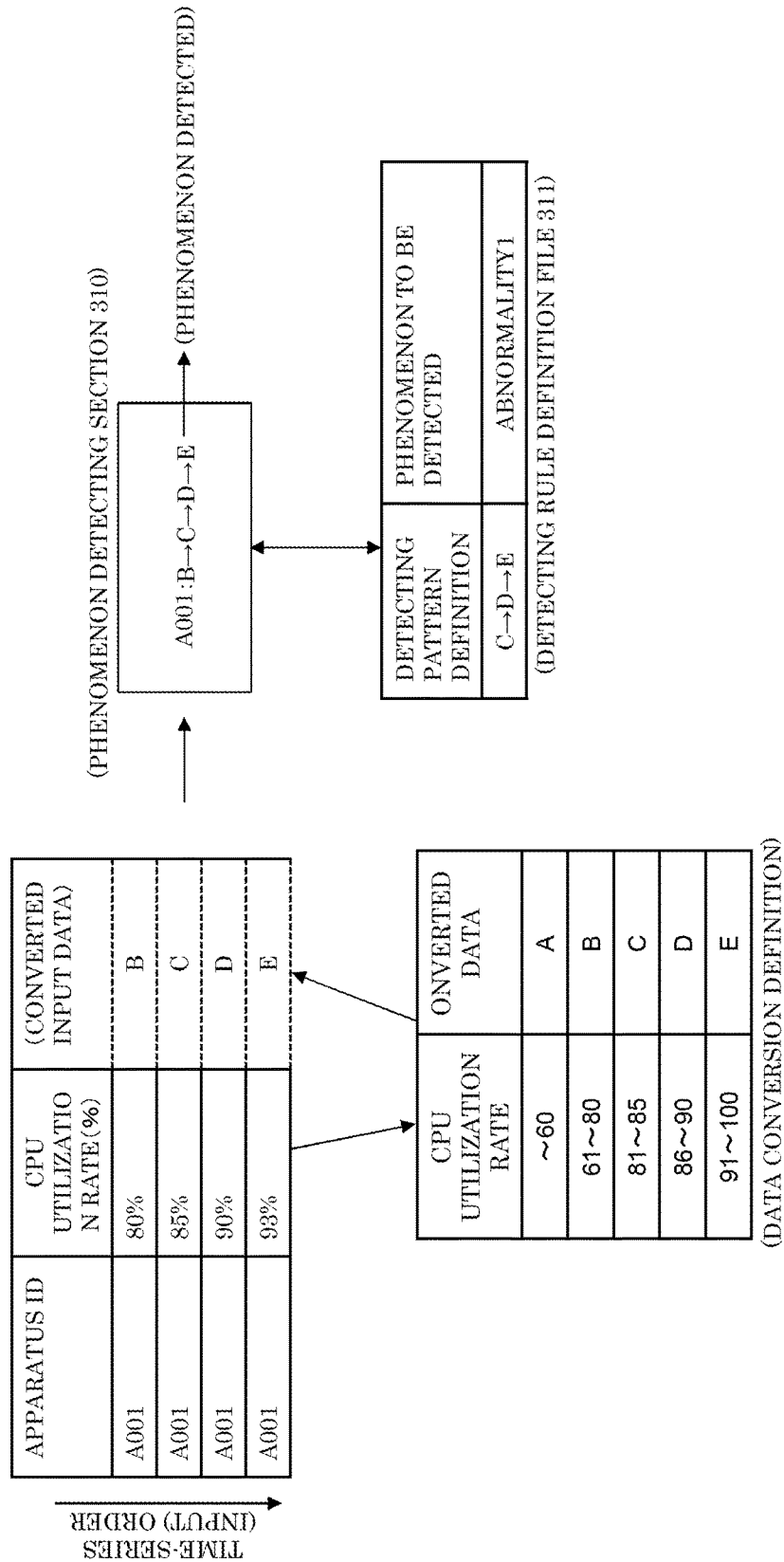

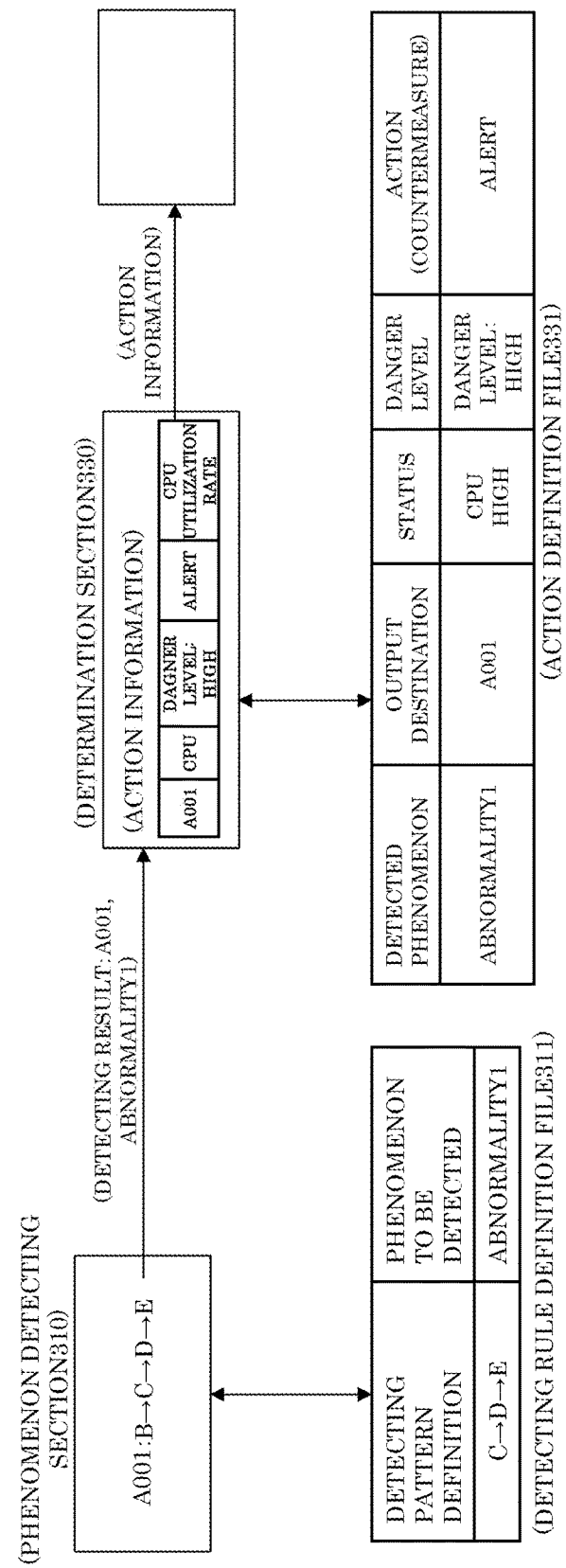

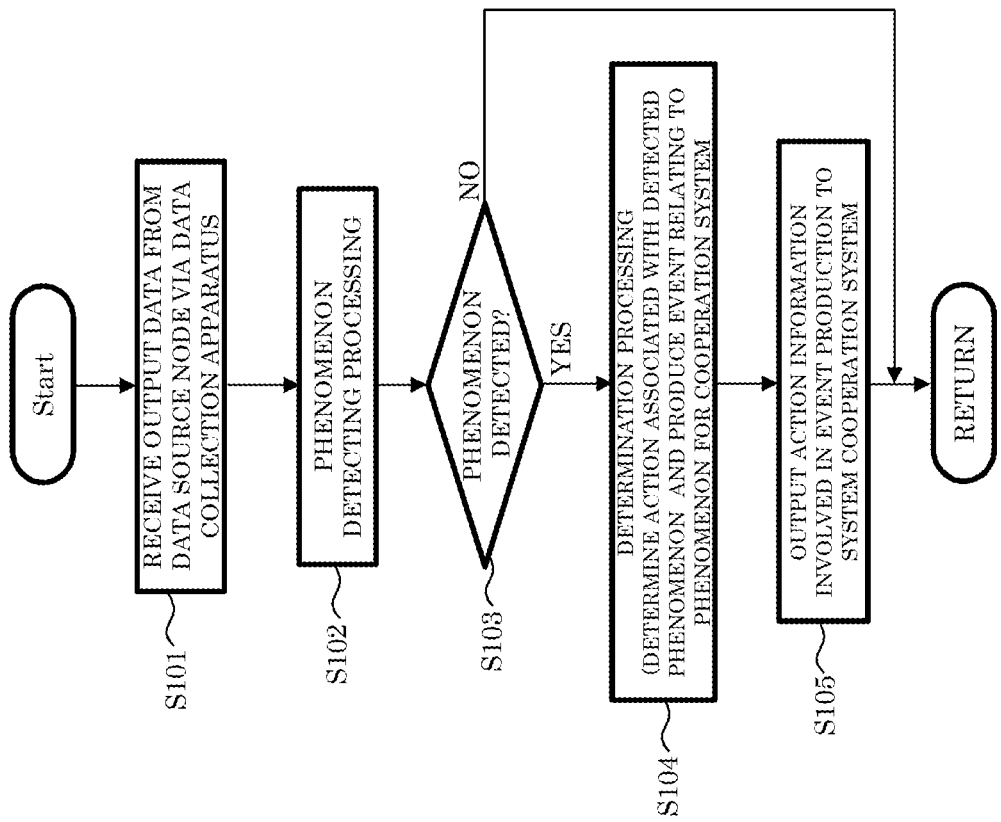
[FIG 7]

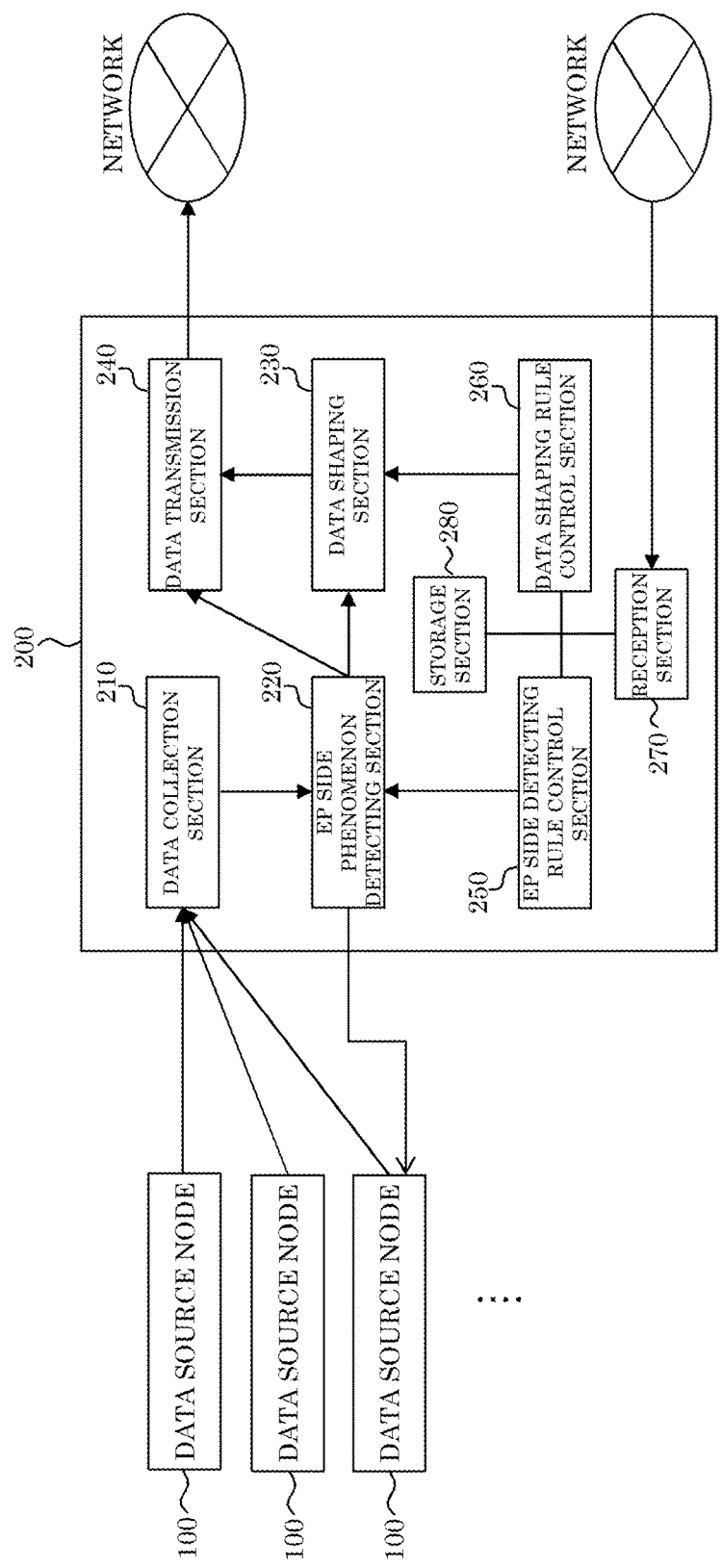

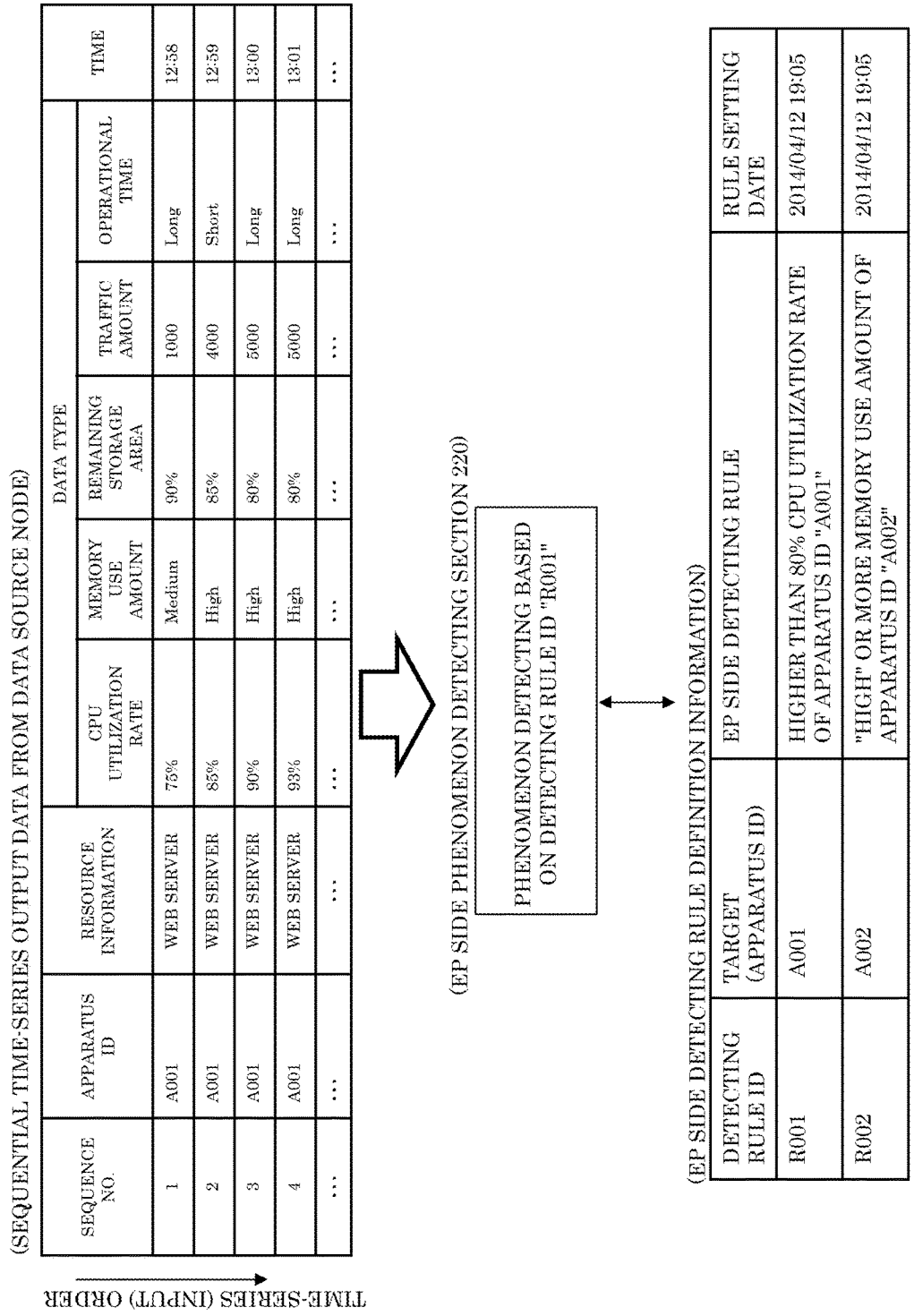
[FIG 9]

[FIG10]

(SEQUENTIAL TIME-SERIES OUTPUT DATA FROM DATA SOURCE NODE)

TIME-SERIES (INPUT) ORDER ↓

| SEQUENCE NO. | APPARATUS ID | RESOURCE INFORMATION | DATA TYPE | | | | | TIME |
|---|---|---|---|---|---|---|---|---|
| | | | CPU UTILIZATION RATE | MEMORY USE AMOUNT | REMAINING STORAGE AREA | TRAFFIC AMOUNT | OPERATIONAL TIME | |
| 1 | A001 | WEB SERVER | 75% | Medium | 90% | 1000 | Long | 12:58 |
| 2 | A001 | WEB SERVER | 85% | High | 85% | 4000 | Short | 12:59 |
| 3 | A001 | WEB SERVER | 90% | High | 80% | 5000 | Long | 13:00 |
| 4 | A001 | WEB SERVER | 83% | High | 80% | 5000 | Long | 13:01 |
| 5 | A001 | WEB SERVER | 79% | High | 80% | 5000 | Long | 13:02 |
| 6 | A001 | WEB SERVER | 80% | High | 80% | 5000 | Long | 13:03 |
| ... | ... | ... | ... | ... | ... | ... | ... | ... |

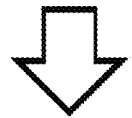

(DATA SHAPING SECTION 230)

DATA SHAPING PROCESSING BASED ON DATA SHAPING RULE

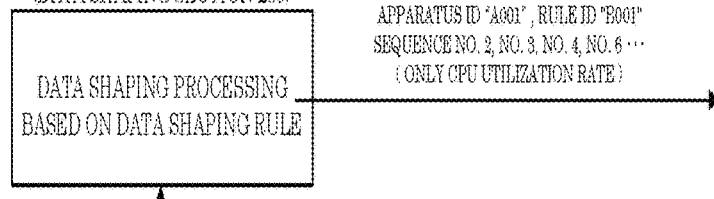

APPARATUS ID "A001", RULE ID "B001"
SEQUENCE NO. 2, NO. 3, NO. 4, NO. 6 ···
(ONLY CPU UTILIZATION RATE)

(DATA SHAPING RULE INFORMATION)

| DATA SHAPING RULE INFORMATION | APPARATUS ID | RESOURCE INFORMATION | DATA SHAPING RULE | | RULE SETTING DATE |
|---|---|---|---|---|---|
| | | | TARGET DATA TYPE | TARGET OUTPUT DATA | |
| B001 | A001 | WEB SERVER | CPU UTILIZATION RATE | 80% OR HIGHER FOR UPLOADING | 2014/04/12 19:04 |
| B002 | A002 | DB SERVER | MEMORY USE AMOUNT | MEDIUM OR MORE FOR UPLOADING | 2014/04/12 19:04 |
| B003 | A002 | DB SERVER | REMAINING STORAGE AREA | 50% OR LOWER FOR UPLOADING | 2014/04/12 19:02 |
| B004 | A003 | DB SERVER | REMAINING STORAGE AREA | 50% OR LOWER FOR UPLOADING | 2014/04/12 19:02 |
| B005 | A004 | PROXY SERVER | TRAFFIC AMOUNT | 5000 OR MORE FOR UPLOADING | |
| B006 | A005 | WEB SERVER | ALL TYPES | ALL DATA | 2014/04/12 19:05 |

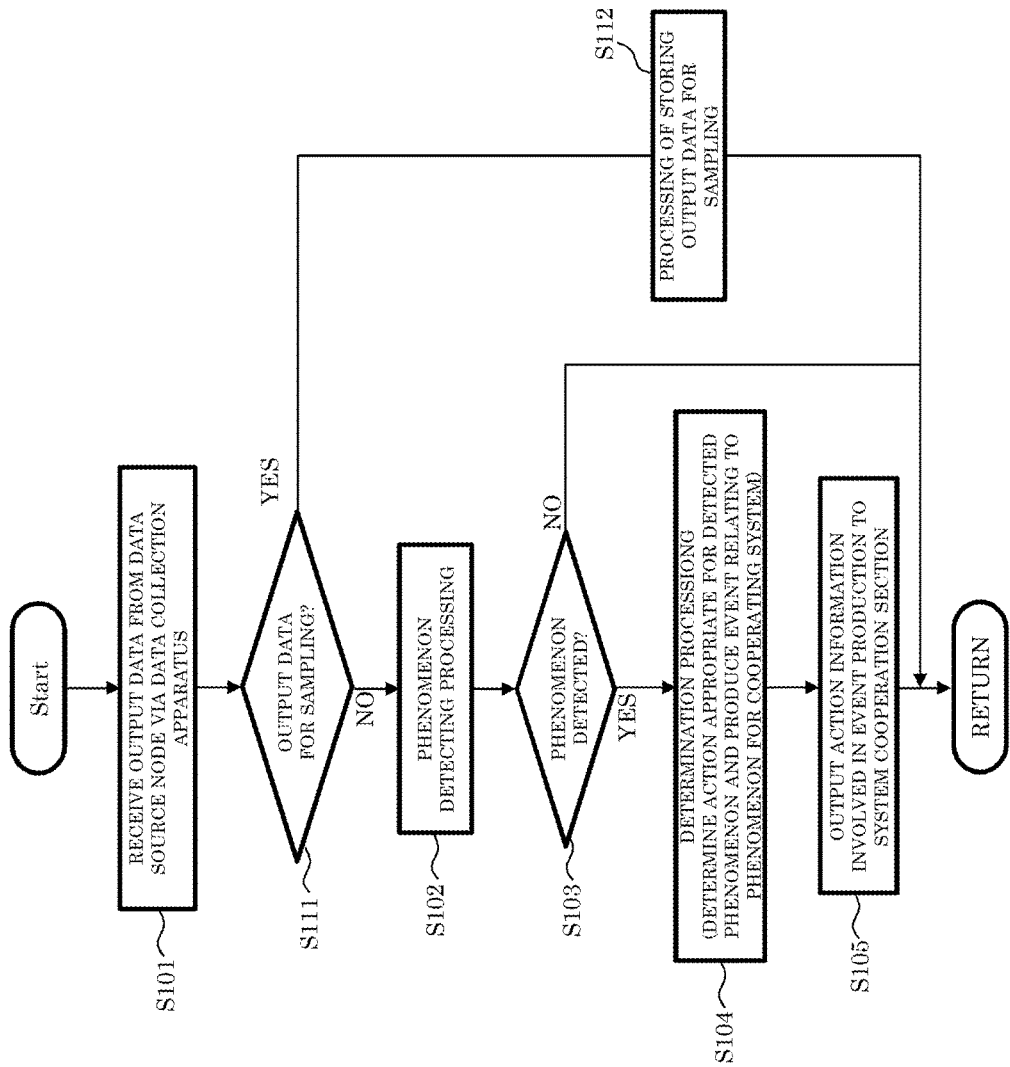
[FIG11]

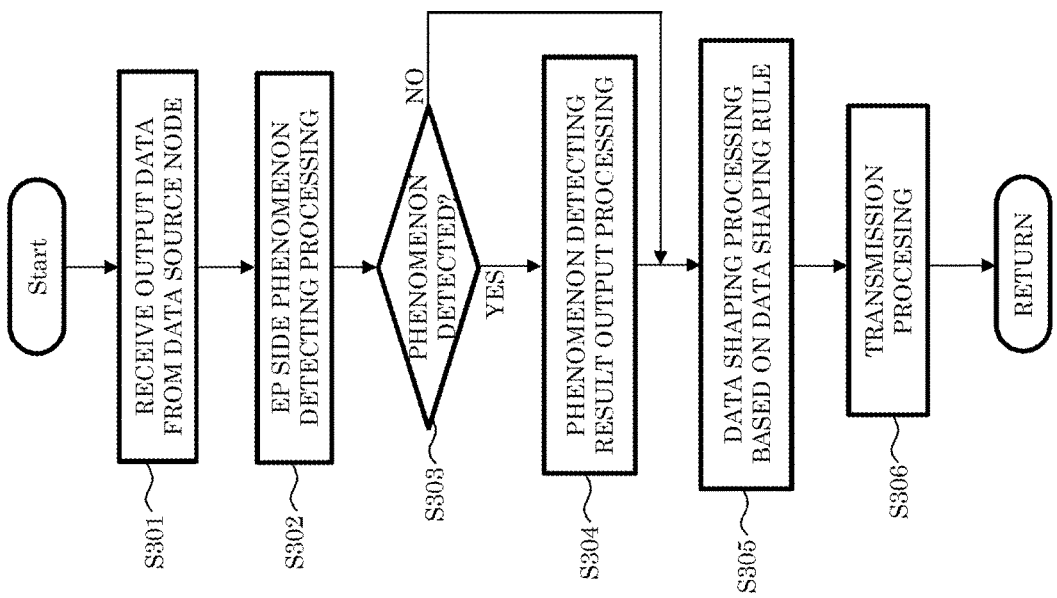
[FIG12]

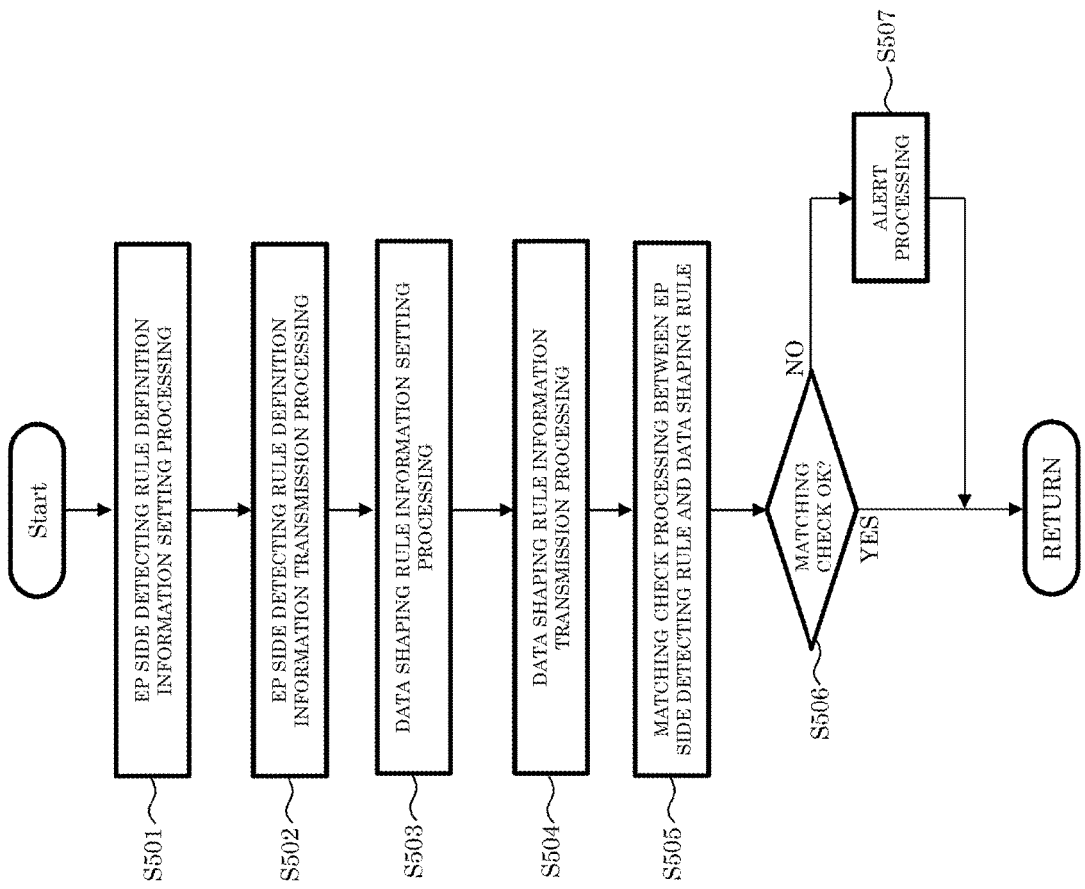
[FIG13]

[FIG14]
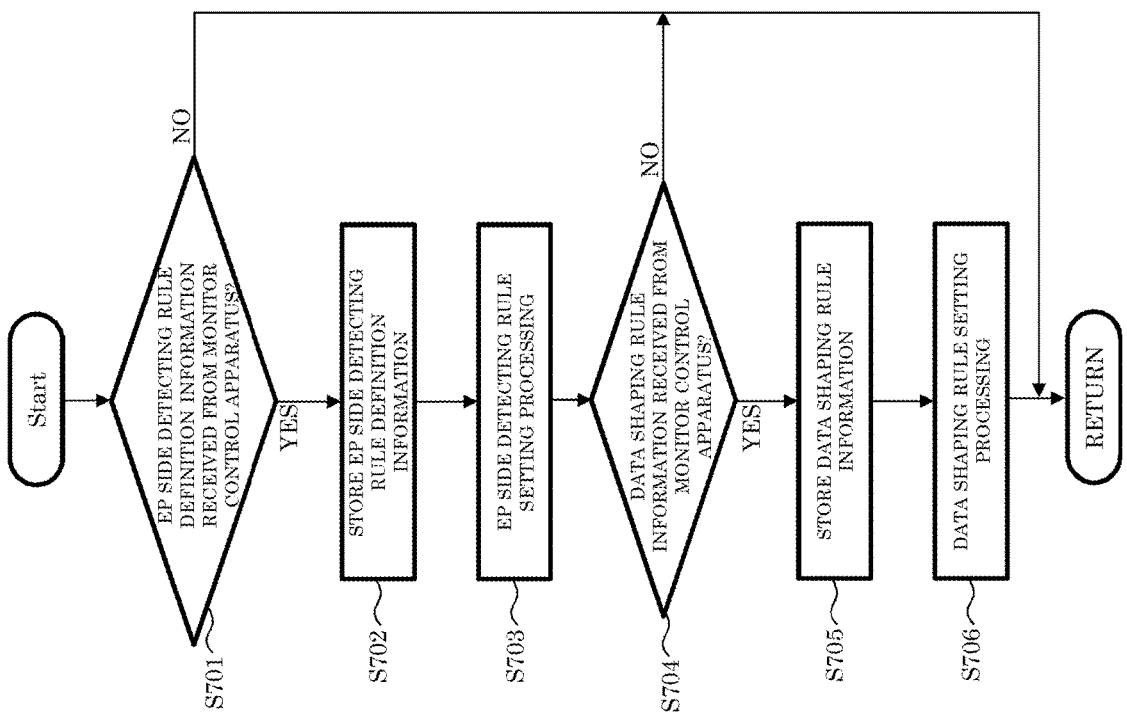

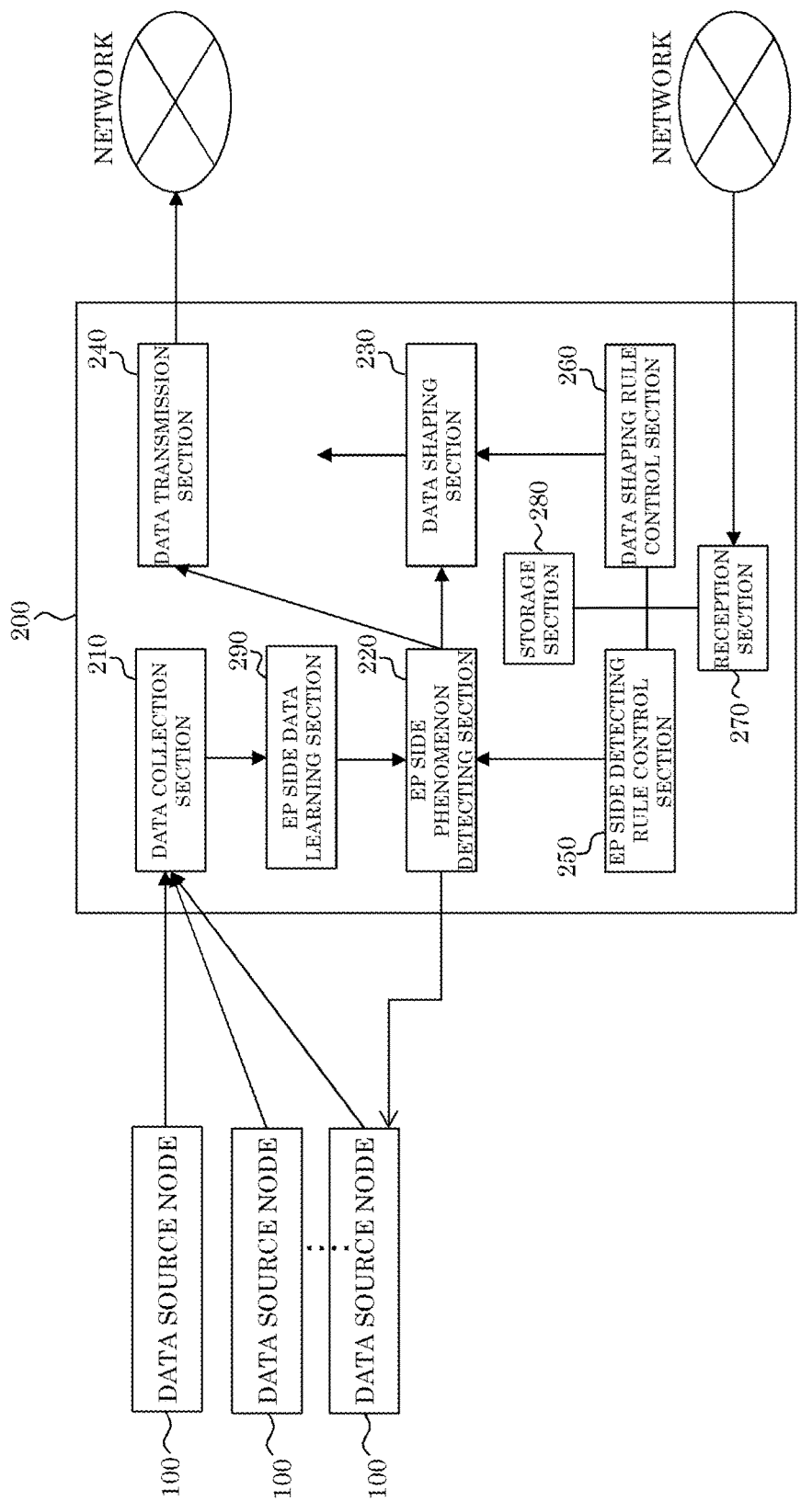
[FIG15]

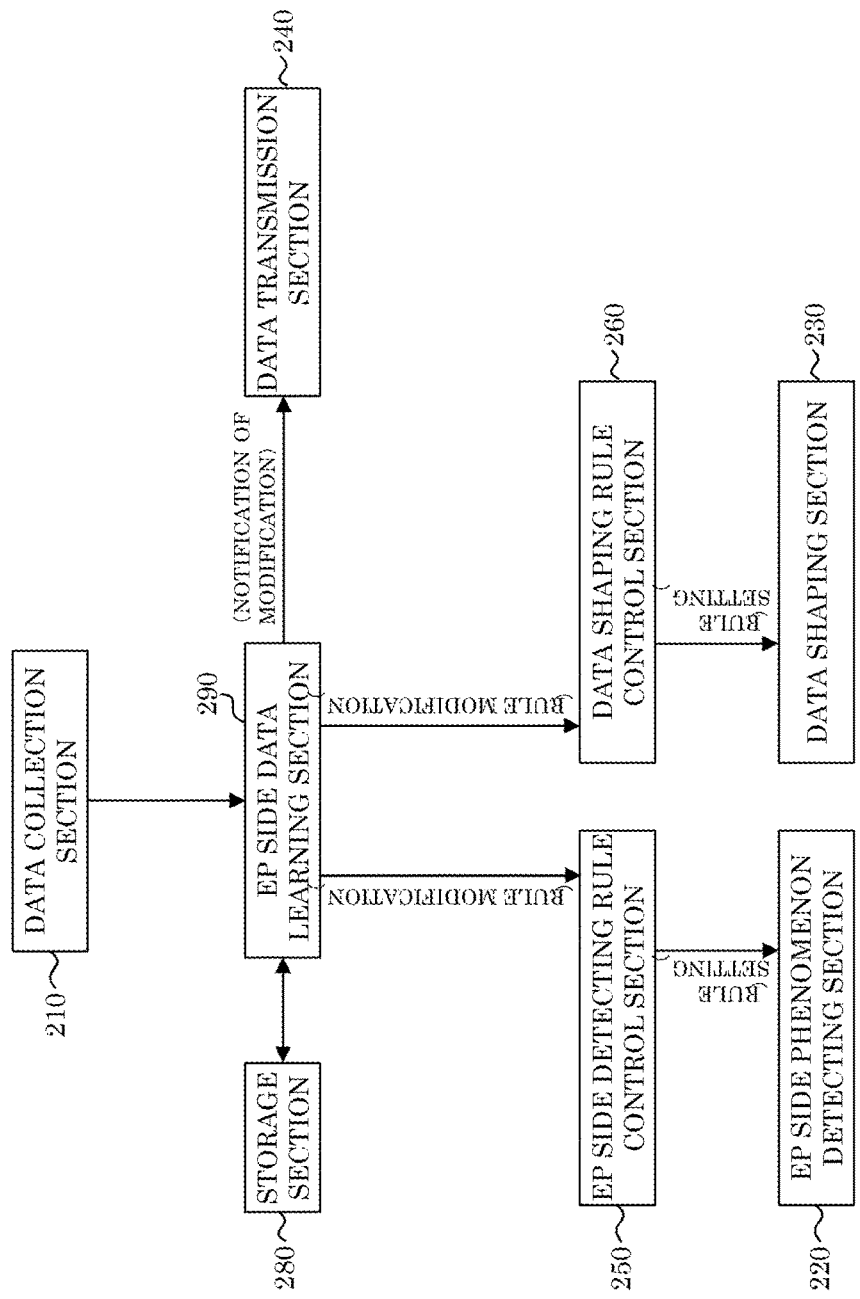
[FIG16]

[FIG17]

(SEQUENTIAL TIME-SERIES OUTPUT DATA FROM DATA SOURCE NODE)

| APPARATUS ID | RESOURCE INFORMATION | DATA TYPE | | | | |
|---|---|---|---|---|---|---|
| | | CPU UTILIZATION RATE | MEMORY USE AMOUNT | REMAINING STORAGE AREA | TRAFFIC AMOUNT | OPERATIONAL TIME |
| A001 | WEB SERVER | 40% | ... | ... | ... | ... |
| A001 | WEB SERVER | 50% | ... | ... | ... | ... |
| ... | ... | ... | ... | ... | ... | ... |
| A001 | WEB SERVER | 50% | ... | ... | ... | ... |
| A001 | WEB SERVER | 80% | ... | ... | ... | ... |

TIME-SERIES (INPUT) ORDER →

TRANSITION OF SEQUENTIAL OUTPUT DATA IN GIVEN TIME PERIOD IS LEARNED TO DETECT DEVIATION FROM APPLIED EP SIDE DETECTING RULE

[FIG18]

| TYPE | SET TYPE | DETECTING RULE ID | EP SIDE DETECTING RULE | RULE SETTING DATE | ALERT DATE | ALERT COUNT |
|---|---|---|---|---|---|---|
| DETECTING | EP SIDE LEARNING | R011 | CPU UTILIZATION RATE ≧ 80% | YYYY/MM/DD | YYYY/MM/DD | XX回 |
| DETECTING | MONITOR CONTROL APPARATUS SIDE LEARNING | R010 | CPU UTILIZATION RATE> 90% | YYYY/MM/DD | YYYY/MM/DD | XX回 |
| DETECTING | MONITOR CONTROL APPARATUS SIDE LEARNING | R009 | CPU UTILIZATION RATE > 70% | YYYY/MM/DD | YYYY/MM/DD | XX回 |
| ... | ... | ... | ... | ... | ... | ... |

( CURRENT EP SIDE DETECTING RULE )

( PAST EP SIDE DETECTING RULE )

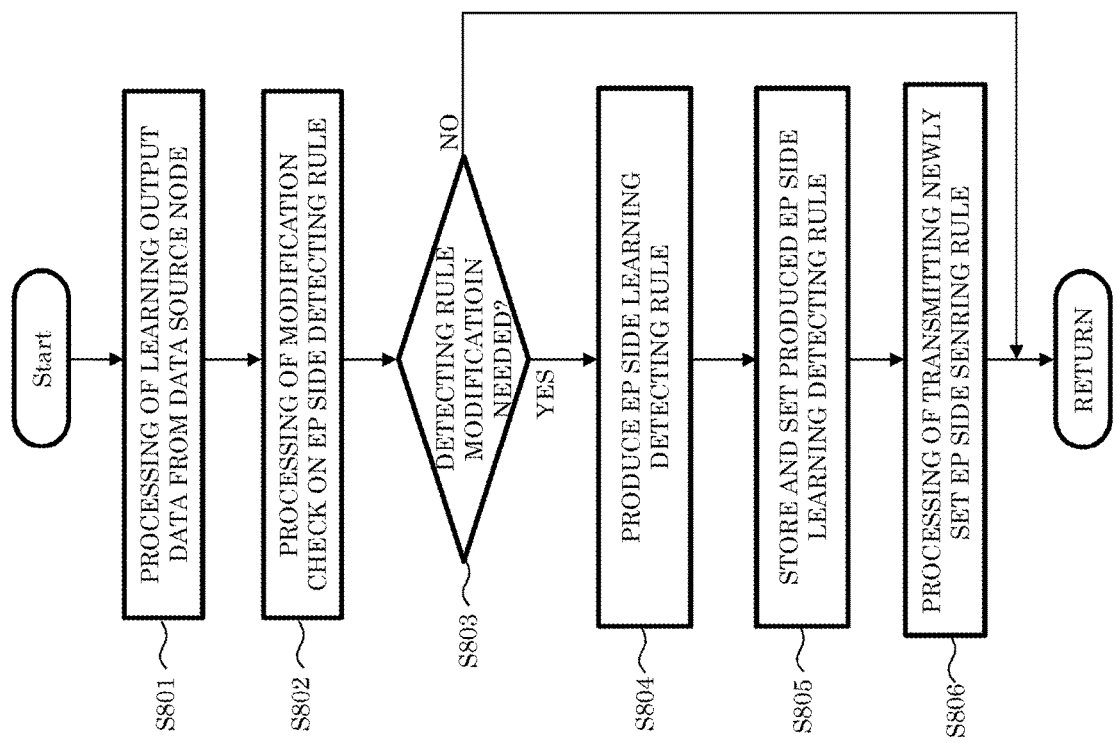

[FIG20]

| TYPE | DATA SHAPING RULE ID | SET TYPE | DATA SHAPING RULE | RULE SETTING DATE | DATA PIECE COUNT DURING INTERVAL PERIOD | DATA CHANGE AMOUNT DURING INTERVAL PERIOD |
|---|---|---|---|---|---|---|
| SHAPING | B101 | EP SIDE LEARNING | AVERAGE OF DATA FOR TEN SECONDS | YYYY/MM/DD | 10 SECONDS | Low |
| SHAPING | B100 | MONITOR CONTROL APPARATUS SIDE LEARNING | AVERAGE OF DATA FOR ONE SECOND | YYYY/MM/DD | ONE SECOND | High |
| SHAPING | B099 | MONITOR CONTROL APPARATUS SIDE LEARNING | AVERAGE OF DATA FOR FIVE SECONDS | YYYY/MM/DD | FIVE SECONDS | Middle |
| .... | | | | | | |

(CURRENT EP SIDE SHAPING RULE) → B101

(PAST EP SIDE SHAPING RULE) → B100, B099

[FIG21]

| TYPE | DATA SHAPING RULE ID | SET TYPE | DATA SHAPING RULE | RULE SETTING DATE | DATA PIECE COUNT DURING INTERVAL PERIOD | DATA CHANGE AMOUNT DURING INTERVAL PERIOD |
|---|---|---|---|---|---|---|
| SHAPING | B201 | EP SIDE LEARNING | DATA AVERAGE FROM SAMPLE SIZE 1000 | YYYY/MM/DD | 1000 | Low |
| SHAPING | B200 | MONITOR CONTROL APPARATUS SIDE LEARNING | DATA AVERAGE FROM SAMPLE SIZE 100 | YYYY/MM/DD | 100 | High |
| SHAPING | B199 | MONITOR CONTROL APPARATUS SIDE LEARNING | DATA AVERAGE FROM SAMPLE SIZE 300 | YYYY/MM/DD | 300 | Middle |
| ... | | | | | | |

(CURRENT EP SIDE SHAPING RULE) ↑ — row B201

(PAST EP SIDE SHAPING RULE) — rows B200, B199, ...

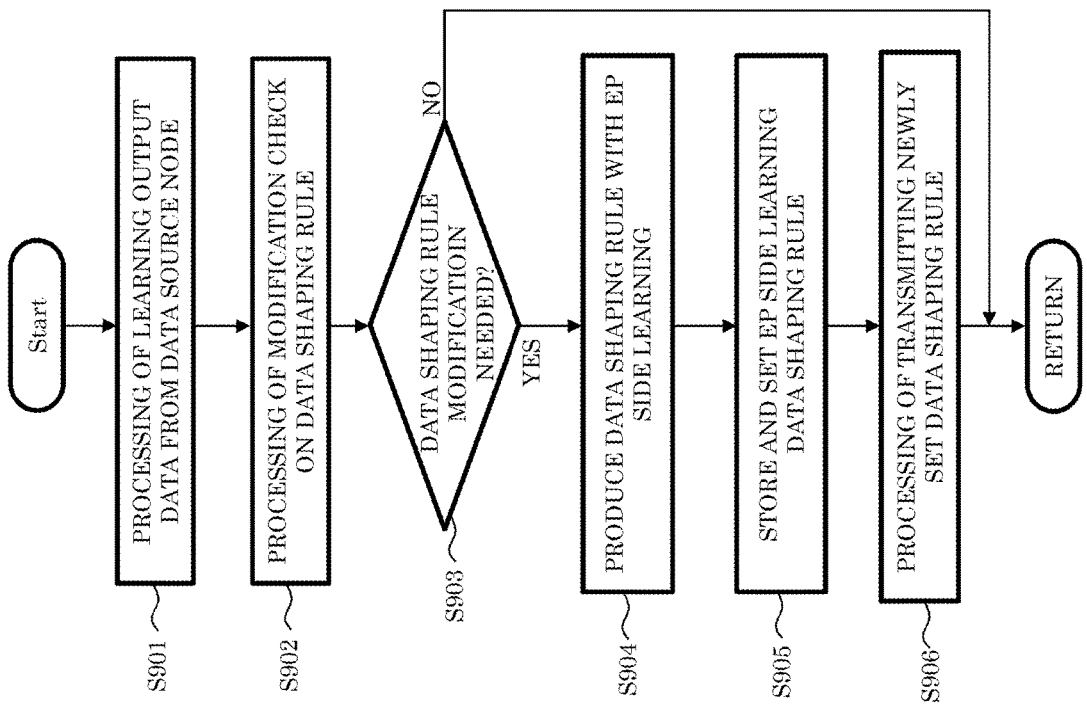
[FIG22]

MONITOR CONTROL SYSTEM AND DATA COLLECTION APPARATUS

TECHNICAL FIELD

Embodiments of the present invention relate to a data collection apparatus configured to collect data from various data sources and transmit the collected data over a network to a monitor control apparatus configured to detect a possible phenomenon from the data collected from the data sources.

BACKGROUND ART

Monitor systems called smart meter monitor systems are known, by way of example. The system connects a wattmeter having a communication function to equipment in a house or commercial building such as an air conditioner, light, and thermometer to monitor the operational condition and the like of the equipment through the wattmeter over a network.

PRIOR ART DOCUMENT

Patent Document

[Patent Document 1] Japanese Patent Laid-Open No. 2012-194806

DISCLOSURE OF THE INVENTION

Problems to be Solved by the Invention

It is an object of the present invention to allow a data collection apparatus connected to various data sources to control transmission of output data from the data sources to a monitor control apparatus configured to detect a possible phenomenon from the output data, thereby reducing the load of transmission of enormous amounts of sequential time-series output data from data source nodes and the load of processing of the data in the monitor control apparatus.

Means for Solving the Problems

A monitor control system according to embodiments includes a monitor control apparatus configured to detect a phenomenon leading to a particular result based on output data pieces output from a plurality of data sources serving as data transmission elements and a data collection apparatus configured to collect the output data pieces and to transmit the collected output data pieces to the monitor control apparatus over a network. The data collection apparatus includes a data collection section configured to receive sequential time-series output data pieces output from the data source for each of the plurality of data sources, a data shaping section configured to process the sequential time-series output data pieces for each of the data sources based on a predetermined data shaping rule set for each of the data sources to perform data shaping processing on the sequential time-series output data pieces such that the resulting data pieces are reduced in number as compared with the output data pieces output from the data source or in data amount as compared with the output data pieces output from the data source, a data transmission section configured to transmit the output data pieces satisfying the data shaping rule obtained through the data shaping processing to the monitor control apparatus and a data shaping rule control section configured to receive the data shaping rule set for each of the data sources from the monitor control apparatus and to set the received data shaping rule in the data shaping section.

BRIEF DESCRIPTION OF THE DRAWINGS

FIG. 1 A diagram showing the network configuration of a monitor control system according to Embodiment 1.

FIG. 2 A block diagram showing the configuration of a monitor control apparatus according to Embodiment 1.

FIG. 3 A diagram showing an example of output data from each data source node according to Embodiment 1.

FIG. 4 A diagram showing an example of chronologically sequential output data pieces from one data source node according to Embodiment 1.

FIG. 5 A diagram for explaining phenomenon detecting processing according to Embodiment 1.

FIG. 6 A diagram for explaining event production processing for a detected phenomenon according to Embodiment 1.

FIG. 7 A diagram showing a processing flow in the monitor control apparatus according to Embodiment 1.

FIG. 8 A block diagram showing the configuration of a data collection apparatus according to Embodiment 1.

FIG. 9 A diagram for explaining phenomenon detecting processing performed by the data collection apparatus according to Embodiment 1.

FIG. 10 A diagram for explaining data shaping processing performed by the data collection apparatus for each data source node according to Embodiment 1.

FIG. 11 A diagram showing a processing flow in the monitor control apparatus according to Embodiment 1 and illustrating an example of phenomenon detecting processing in which output data for sampling is taken into account.

FIG. 12 A diagram showing a processing flow in the data collection apparatus according to Embodiment 1

FIG. 13 A diagram showing a processing flow in the monitor control apparatus according to Embodiment 1 and illustrating processing of setting an EP side detecting rule and a data shaping rule.

FIG. 14 A diagram showing a processing flow in the data collection apparatus according to Embodiment 1 and illustrating processing of setting the EP side detecting rule and the data shaping rule transmitted from the monitor control apparatus.

FIG. 15 A block diagram showing the configuration of a data collection apparatus according to Embodiment 2.

FIG. 16 A diagram for explaining processing of modifying an EP side detecting rule and a data shaping rule performed by an EP side data learning section according to Embodiment 2.

FIG. 17 A diagram showing an example of chronologically sequential output data pieces according to Embodiment 2.

FIG. 18 A diagram showing an example of EP side detecting rule definition information according to Embodiment 2.

FIG. 19 A flow chart showing the processing of modifying the EP side detecting rule performed by the EP side data learning section according to Embodiment 2.

FIG. 20 A diagram showing an example of data shaping rule information according to Embodiment 2.

FIG. 21 A diagram showing an example of the data shaping rule information according to Embodiment 2.

FIG. 22 A flow chart showing the processing of modifying the data shaping rule performed by the EP side data learning section according to Embodiment 2.

MODE FOR CARRYING OUT THE INVENTION

Preferred embodiments of the present invention will hereinafter be described with reference to the accompanying drawings.

Embodiment 1

FIG. 1 is a diagram showing the network configuration of a monitor control system according to Embodiment 1. In the monitor control system according to the present embodiment, a monitor control apparatus 300 is connected to a data collection apparatus 200 over a network, and the data collection apparatus 200 is connected to a plurality of data source nodes 100. The monitor control apparatus 300 is connected to a plurality of system nodes 500.

The data source node 100 is, for example, a data acquirement device such as a wattmeter or a management system connected to a plurality of data acquirement devices to manage and control those data acquirement devices, and corresponds to a node (data transmission element) serving as a data source which transmits data to the monitor control apparatus 300. The data source node 100 can include a communication section, a processing section, a storage section and the like, although not shown, and outputs time-series data acquired sequentially from the data acquirement device and indicating power usage or the like to the data collection apparatus 200 over a wired or wireless communication network.

Another example of the data source node 100 is a data acquirement device in each of server apparatuses constituting a WEB system, a CRM (customer relationship management) system, or an EAM (enterprise asset management) system. In this case, the server apparatus itself can serve as a data acquirement device. Examples of the data output from the data source node 100 is the operational status of the server apparatus (including CPU utilization rate, memory use amount, remaining storage area, and operational time), a traffic amount in the overall system, and the environment information of the system or the server apparatus (including temperature and humidity). The data output from the data source node 100 is sequential time-series data and output to the data collection apparatus 200 via the wired or wireless communication network.

Yet another example of the data source node 100 is a POS (Point of Sale) system. The POS system records commodity sales information at each shop in real time and sends the sales information for inventory management or marketing management to a server apparatus which performs sales management. Such a POS system also corresponds to a data source which transmits sales information acquired by a data acquirement device such as a register and a barcode reader, and outputs time-series data acquired sequentially and indicating shop sales information (including sales figures, selling price for each commodity, and number of customers) to the data collection apparatus 200 over the wired or wireless communication network. The data source node 100 can also include a data transmission element which transmits weather information or stock prices. The data source nodes 100 are individually connected as independent data transmission elements to the data collection apparatus 200.

The data collection apparatus 200 is an apparatus for collecting the output data from the plurality of data source nodes 100 and inputting the collected data to the monitor control apparatus 300. The data collection apparatus 200 is located between the monitor control apparatus 300 and each of the data source nodes 100 and controls the output data from each of the data source nodes 100 to be input to the monitor control apparatus 300. A plurality of data collection apparatuses 200 may be provided for each of the data source nodes 100 such that each of the plurality of data collection apparatuses 200 transmits output data to the monitor control apparatus 300.

The monitor control apparatus 300 receives sequential input of the time-series output data from each of the data source nodes 100. The monitor control apparatus 300 performs detecting processing of sequentially (in real time) processing the output data from each data source node to detect a possible phenomenon. The monitor control apparatus 300 can also perform, in a series of operations, event processing of determining an action appropriate for the detected phenomenon to produce an event and output processing of outputting a notification for the determined action or control information for performing predetermined control to the associated system (system node 500).

The system node 500 is equipment or a system (for example, a server apparatus constituting the system) which receives the notification or the control information (control command) for performing predetermined control output from the monitor control apparatus 300. The system node 500 cooperates with the monitor control apparatus 300, and in response to an event for the phenomenon detected by the monitor control apparatus 300, performs a predetermined action based on the control information received from the monitor control apparatus 300 or receives the notification of a message such as an audible alert for promoting the predetermined action.

The system node 500 is connected to the monitor control apparatus 300 via a system cooperation section 400. The system cooperation section 400 has the delivering function of notifying an event produced in the monitor control apparatus 300 to the associated single or plurality of system nodes 500 or transmitting a predetermined control command.

The monitor control apparatus 300 extracts action information in association with the detected phenomenon to produce an event for the system node 500. The monitor control apparatus 300 outputs the extracted action information to the system cooperation section 400. The system cooperation section 400 transmits the input action information involved in the production of the event to each associated system node 500 over a wired or wireless communication network.

The system node 500 and the data source node 100 may be the same node. For example, the monitor control apparatus 300 sequentially receives time-series output data indicating the operational status or the traffic amount from a server apparatus (WEB server) serving as the data source node in a WEB system. The monitor control apparatus 300 detects a predetermined phenomenon based on the output data received from the WEB system and determines a predetermined action appropriate for the detected phenomenon to produce an event. Then, the monitor control apparatus 300 can output the predetermined action determined (extracted) from the detected phenomenon to the same server apparatus serving as the system node in the WEB system via the system cooperation section 400.

The system node 500 and the data source node 100 may be different nodes in an aspect. By way of example, the data source node 100 may be a weather observation instrument such as a rain gauge (also capable of measuring accumulated snow), thermometer, and hygrometer, and the system node 500 may be a field service system. In this case, the monitor control apparatus 300 sequentially receives time-series output data indicating the rainfall amount (accumulated snow), temperature, or humidity from the weather observation instrument serving as the data source node. The monitor control apparatus 300 detects a phenomenon based on the output data received from the weather observation instrument and determines a predetermined action appropriate for the detected phenomenon to produce an event. The monitor control apparatus 300 can output a predetermined action (for example, a control command for broadcasting a predetermined message such as a message indicating an expected increase in car accident due to increased accumulated snow from the field service system to information terminal apparatuses carried by workers) to the field service system serving as the system node 500 via the system cooperation section 400.

Next, the monitor control apparatus 300 of the present embodiment is described in detail. FIG. 2 is a block diagram showing the configuration of the monitor control apparatus 300.

As shown in FIG. 2, the monitor control apparatus 300 is configured to include a data reception section 301, a transmission section 302, a phenomenon detecting section 310, a statistical analysis processing section 320, a determination section 330, a learning control section 340, an EP side detecting rule setting section 361, and a data shaping setting section 362. The monitor control apparatus 300 can also include a detecting rule definition file 311, an action definition file 331, a feedback (FB) data storage section 351, a data shaping rule storage section 352, and a collected data storage section 353.

The data reception section 301 receives output data from the data source node 100 transmitted from the data collection apparatus 200 via the network and performs first output processing of outputting the data to the phenomenon detecting section 310 and second output processing of outputting the data to the collected data storage section 353 and/or the learning control section 340.

The phenomenon detecting section 310 processes the sequential time-series output data from the data source node 100 to detect a predetermined phenomenon based on the detecting rule definition file 311. The statistical analysis processing section 320 statistically analyzes the output data acquired in a given time period and outputs the statistical analysis result to the phenomenon detecting section 310.

The determination section 330 extracts a predetermined action from the action definition file 331 to produce an event for the predetermined phenomenon detected by the phenomenon detecting section 310 and outputs the extracted predetermined action as action information involved in the production of the event to the system cooperation section 400. Information including the detecting rule definition file 331 and the action definition file 331 can be stored in a predetermined storage area (not shown) of the monitor control apparatus 300.

FIG. 3 is a diagram showing an example of the output data from the data source node 100 in the present embodiment. As shown in FIG. 3, the output data from the data source node 100 includes, for example, an apparatus ID corresponding to a header for identifying the data source node 100 and a plurality of storage areas associated with a plurality of data types. The data types include the operational status of the server apparatus and the traffic amount in the overall system as described above. FIG. 4 is a diagram showing an example of time-series output data pieces with an apparatus ID "A001" in the present embodiment input sequentially to the monitor control apparatus 300.

FIG. 5 is a diagram for explaining phenomenon detecting processing in the present embodiment. Upon sequential input of time-series output data pieces from each data source node 100, the phenomenon detecting section 310 detects a predetermined phenomenon based on a change in the sequential time-series output data pieces from the data source node 100 with the apparatus ID "A001" as shown in FIG. 4, for example.

In the example of FIG. 5, a data conversion definition is previously set in which the CPU utilization rates ranging from 0% to 100% are classified into a plurality of categories, and a predetermined phenomenon is detected on the basis of a change in the category converted from the output data. The data conversion definition is used to match the time constants in those data pieces and to classify the numerical data, thereby allowing easy recognition of a change in the sequential time-series data corresponding to a predetermined phenomenon. Alternatively, the input sequential data may be used without the data conversion in detecting a predetermined phenomenon.

As shown in FIG. 5, the convention of the CPU utilization rate input from the data source node 100 according to the data conversion definition can show that the CPU utilization rate associated with the apparatus ID "A001" transitions from B to C, D, and then E in chronological order.

The detecting rule definition file 311 is a file which includes definition information (detecting rule definition data) provided by associating a chronological pattern of transition (sequence in chronological order) according to the data conversion definition with a particular phenomenon. The phenomenon detecting section 310 refers to the detecting rule definition file 311 to determine whether or not the transition of the CPU utilization rate in chronological order (categories after data conversion) matches any pattern predefined for a particular phenomenon, and when a match is found, detects that the particular phenomenon has occurred or that the particular phenomenon will occur.

Each pattern in the detecting rule definition file 311 of the present embodiment is information for detecting a pattern associated with a phenomenon leading to a particular result from the output data pieces arranged in chronological order. By way of example, for a pattern (phenomenon) leading to an "abnormality (result)," definition can be made as appropriate from the past statistical data and empirical rules such that the "abnormality" is detected when the output data transitions in a pattern of C to D to E in chronological order.

The pattern associated with the phenomenon leading to the particular result can be created with a known phenomenon pattern extraction technology. For example, the technologies described in U.S. Pat. No. 4,181,193, U.S. Pat. No. 1,398,907, U.S. Pat. No. 4,202,798, and U.S. Pat. No. 4,398,777 can be used to create a pattern associated with a phenomenon leading to a particular result. The detecting rule definition file 311 can be updated as appropriate. These phenomenon pattern extraction technologies can be used to newly produce a relationship between sequentially changing output data and an associated phenomenon or to change an already created pattern associated with a phenomenon leading to a particular result.

In the example of FIG. 5, the phenomenon detecting section 310 detects the transition from C to D to E of the output data with the apparatus ID "A001" arranged in chronological order associated with a phenomenon leading to the "abnormality." In the present embodiment in which the detecting rule definition file 311 defines the phenomenon pattern of "C to D to E," the input of "C to D" can be identified even when C or E is input after the input of C and before the input of D in chronological order, and after that, the input of "C to D to E" can be identified even when C or D is input after the input of D and before the input of E.

A plurality of phenomenon patterns may be set in association with a single result (system abnormality). For example, chronological patterns of data sequence of "D to E to E," "D to D to F," and "C to D to D" can be defined as being associated with the "abnormality." in this case, each of the chronological patters can be assigned a priority based on reliability (for example, the scale of original data) or occurrence probability (for example, the probability of occurrence of the phenomenon pattern). For example, when the priority is assigned based on the reliability, preferential matching of the pattern "D to to E" is defined since this pattern has the highest reliability of those phenomenon patterns associated with the abnormality. When the priority is assigned based on the probability, preferential matching of the "C to D to D" is defined since this pattern has the highest probability of those phenomenon patterns associated with the system abnormality. In this manner, the pattern detected with a higher priority can be previously set among the plurality of phenomenon patterns.

Although an example of the phenomenon detecting processing has been described in which the chronological sequence of time-series output data matches any particular phenomenon pattern specified in the detecting rule definition file 311, the present invention is not limited thereto. For example, output data between the data source nodes 100 can be used to perform the phenomenon detecting. Specifically, a detecting rule is defined such that a "system abnormality" is detected when the apparatus ID "A001" has a CPU utilization rate of 90% or higher and an apparatus ID "A002" has a memory use amount "High," or a detecting rule is defined such that a "resource abnormality" is detected when each of the apparatus ID "A002" and an apparatus ID "A003" has a remaining storage area of 50% or less.

When the chronological sequence of time-series output data matches any particular phenomenon pattern specified in the detecting rule definition file 311, the phenomenon detecting section 310 outputs the detecting result to the determination section 330. FIG. 6 is a diagram for explaining event production processing performed by the determination section 330 of the present embodiment.

As shown in FIG. 6, the phenomenon detecting section 310 outputs information including the apparatus ID "A001" and the result "abnormality 1" estimated from the phenomenon pattern as the detecting result to the determination section 330. Based on the input detecting result, the determination section 330 determines what action should be performed in response to the result "abnormality 1" estimated from the phenomenon pattern and produces an event for the cooperating system node 500.

The present embodiment includes the action definition file 331 in which the estimated result "abnormality 1" is previously associated with a predetermined action. The action definition file 331 is information in which each of the detected particular phenomena in the detecting rule definition file 311 is linked to a single or a plurality of action information pieces. Thus, as shown in the example of FIG. 6, the determination section 330 refers to the action definition file 331 by using, as a key, the detected phenomenon "abnormality 1" included in the detecting result output from the phenomenon detecting section 310 to extract the associated action information.

The determination section 330 extracts (produces) the predetermined action appropriate for the detected phenomenon to produce an event for each cooperating system node 500 and outputs the action information involved in the event production to the system cooperation section 400 responsible for controlling the delivery of the action information to each system node 500. The determination section 330 outputs the action information together with an "output destination" included in the action definition file 331 to the system cooperation section 400, so that the system cooperation section 400 can deliver the action information to the system node 500 corresponding to the "output destination."

In the example of FIG. 6, the action information includes the output destination, the status of the output destination ("CPU high"), danger level ("high"), and action (alert), for example. The status of the output destination and the danger level represent the details of the detected phenomenon. The action represents a countermeasure which specifies that the associated system node 500 is notified of the detected phenomenon (message content) or that the system node 500 is caused to perform predetermined control (control command). An application program operating on the monitor control apparatus 300 may be executed and the execution result may be included in the action.

The action information may be configured to include supplementary information. For example, the actually measured values of the CPU utilization rate can be extracted from the output data pieces arranged in chronological order acquired at the time of abnormality detecting and can be included in the action information for delivery to the system node 500.

The phenomenon detecting section 310 can also use the statistical result of statistical processing in the statistical analysis processing section 320 to detect a phenomenon leading to a particular result. For example, the statistical analysis processing section 320 can perform statistical processing on the sequential time-series output data received in a given time period and output the calculated statistical result "average value" to the phenomenon detecting section 310. The phenomenon detecting section 310 can compare the statistical result output from the statistical analysis processing section 320 with a predetermined threshold value previously specified in the detecting rule definition file 311 to detect that a phenomenon leading to a particular result will occur. The detecting rule definition file 311 can include the relationship between a statistical result and a predetermined threshold value for each phenomenon leading to a particular result as a change attribute for a phenomenon to be detected.

As described above, the present embodiment includes the first phenomenon detecting processing of detecting a particular phenomenon based on the chronological pattern of the sequential time-series output data and the second phenomenon detecting processing of detecting a particular phenomenon based on the statistical result of the sequential time-series output data received in the given time period. Since the first and second phenomenon detecting processing can be performed independently of each other, a phenomenon which cannot be detected on the basis of the chronological pattern of the output data can be detected on the basis of the statistical result obtained in the Given time period, or conversely, a phenomenon which cannot be detected on the basis of the statistical result can be detected on the basis of the chronological pattern of the output data. Thus, a particular phenomenon can be detected with high accuracy.

FIG. 7 is a diagram showing a processing flow in the monitor control apparatus 300 according to the present embodiment. As shown in FIG. 7, the monitor control apparatus 300 sequentially receives time-series output data of the plurality of data source nodes 100 from the data collection apparatus 200 over the network (S101).

The monitor control apparatus 300 detects the presence or absence of occurrence of any particular phenomenon specified in the detecting rule definition file 311 based on the received sequential time-series output data (S102).

Upon detecting of a particular phenomenon specified in the detecting rule definition file 311 (YES at S103), the monitor control apparatus 300 extracts (produces) a predetermined action appropriate for the detected phenomenon to produce an event for each cooperating system node 500 (S104). The monitor control apparatus 300 outputs the extracted action information involved in the event production to the system cooperation section 400 responsible for controlling delivery to each system node 500 (S105).

The monitor control apparatus 300 according to the present embodiment can control, through a series of operations, detecting of a possible phenomenon from the data collected from various data sources, determination of an appropriate action for the detected phenomenon (production of the event), and output of a notification for the determined action or output for performing predetermined control to the associated system. This allows the detecting of the phenomenon, the determination of the appropriate action, and the processing for the associated system to be performed automatically without manual intervention to realize quick system monitoring and the like.

<Detailed Description of Data Collection Apparatus 200>

As described above, the monitor control apparatus 300 detects a possible phenomenon based on the output data collected from various data source nodes 100. If all the output data including output data necessary for detecting a particular phenomenon is input to the monitor control apparatus 300, problems arise in which the load (data transmission load) is increased on the network between the data collection apparatus 200 and the monitor control apparatus 300 and the processing load of the phenomenon detecting is increased in the monitor control apparatus 300.

To address them, in the present embodiment, the data collection apparatus 200 connected to the plurality of data source nodes 100 controls transmission of output data from the data source nodes 100 to the monitor control apparatus 300 such that all the output data provided sequentially in chronological order from the data source nodes 100 is not uploaded to the monitor control apparatus 300.

Thus, the sequential time-series output data from the data soured nodes 100 input to the monitor control apparatus 300 in the above description is output data selected (subjected to thinning-out), for example on the basis of a predetermined data shaping rule, from a plurality of output data pieces provided actually from the data source nodes 100 to the data collection apparatus 200. The monitor control apparatus 300 receives input of this sequential time-series output data selected by the data collection apparatus 200 to perform the phenomenon detecting processing.

FIG. 8 is a block diagram showing the configuration of the data collection apparatus 200 according to the present embodiment. The data collection apparatus 200 is configured to include a data collection section 210, an EP side phenomenon detecting section 220, a data shaping section 230, a data transmission section 240, an EP side detecting rule control section 250, a data shaping rule control section 260, a reception section 270, and a storage section 280.

The data collection section 210 is connected to the plurality of data source nodes 100 and sequentially receives output data in chronological order from each data source node 100. The data collection section 210 outputs the sequential time-series data output received from the data source node 100 to the EP side phenomenon detecting section 220. The EP is an abbreviation of "end point" and is added to be distinguished from the phenomenon detecting section 310 in the monitor control apparatus 300 for convenience of description. This applies to EP side detecting rule definition information, later described.

The EP side phenomenon detecting section 220 processes the output data from the data source node 100, detects a predetermined phenomenon based on the EP side detecting rule definition information, and outputs the detecting result. FIG. 9 is a diagram for explaining phenomenon detecting processing performed by the EP side phenomenon detecting section 220. As shown in FIG. 9, the EP side detecting rule definition information is configured to include an detecting rule ID, an apparatus ID of a target apparatus to which this detecting rule is applied, the EP side detecting rule, and a rule setting date.

The EP side phenomenon detecting section 220 refers to the sequential time-series output data input thereto from the data collection section 210 to determine whether or not the CPU utilization rate associated with the apparatus ID "A001" is 80% or higher. When the CPU utilization rate associated with the apparatus ID "A001" is 80% or higher, the EP side phenomenon detecting section 220 outputs information including additional information indicating the apparatus ID "A001" and an detecting rule ID "R001" as the detecting result to a server apparatus having the apparatus ID "A001." The detecting result may be transmitted to the monitor control apparatus 300. In this case, the EP side phenomenon detecting section 220 outputs the detecting result to the data transmission section 240, and the data transmission section 240 transmits the result of phenomenon detecting on the EP side to the monitor control apparatus 300.

Whereas the monitor control apparatus 300 detects an "abnormality" from a change in sequential time-series output data, the EP side phenomenon detecting section 220 detects a phenomenon of whether or not the output data exceeds a given reference. The reason why such phenomenon detecting processing is performed by the data collection apparatus 200 is that, when the situation is not yet at the point where the monitor control apparatus 300 detects an "abnormality" from a change in sequential time-series output data but there is a possibility of "abnormality," the data collection apparatus 200 can directly notify the data source node 100 of that possibility without involving the monitor control apparatus 300 to address the possible abnormality.

The EP side phenomenon detecting section 220 receives input of the sequential time-series output data from the data collection section 210, and the sequential time-series output data input from the data collection section 210 is input to the data shaping section 230 from the EP side phenomenon detecting section 220 with no change. The EP side phenomenon detecting section 220 only refers to the sequential time-series output data input thereto from the data collection section 210 to perform the phenomenon detecting processing but does not perform any processing on the output data.

The data shaping section 230 performs data shaping processing on the output data from each data source node 100 based on data shaping rule information and outputs the result to the data transmission section 240. FIG. 10 is a diagram for explaining the data shaping processing.

The data shaping rule information is configured to include a data shaping rule ID, an apparatus ID of a target apparatus to which this data shaping rule is applied, the data shaping rule, and a rule setting date. The data shaping rule includes information for specifying which data type to be extracted from a plurality of data types included in the output data from the data source node 100 and information for specifying which output data piece to be extracted from the sequential time-series output data pieces from the data source node 100.

Upon input of the output data of each data source node 100 from the EP side phenomenon detecting section 220, the data shaping section 230 performs the data shaping processing based on the data shaping rule associated with the apparatus ID included in the data shaping rule information. For example, of output data pieces from the apparatus having the apparatus ID "A001" shown in FIG. 10, any output data piece indicating a CPU utilization rate of 80% or higher is extracted, whereas any output data piece indicating a CPU utilization rate less than 80% is discarded. In the example of FIG. 10, output data pieces of sequence No. 1 and sequence No. 5 are discarded and thus are not transmitted to the monitor control apparatus 300.

The data shaping rule 230 provides shaped data by organizing the output data pieces indicating a CPU utilization rate of 80% or higher into a data format including only the data fields of the data type "CPU utilization rate." in the example of FIG. 10, output data pieces of sequence No. 2, No. 3, No. 4, and No. 6 are organized into a data format including only the data fields of the data type "CPU utilization rate," and the produced shaped data is output to the data transmission section 240 as output data of the data source node 100. The data transmission section 240 transmits the output data (shaped data) the monitor control apparatus 300 over the network.

The data shaping section 230 refers to the apparatus ID of output data from each data source node 100 and applies the data shaping rule associated with that apparatus ID to determine whether or not the output data is to be transmitted to the monitor control apparatus 300. When the output data is not to be transmitted, the data shaping section 230 discards that output data, so that the number of output data pieces to be transmitted to the monitor control apparatus 300 can be reduced. In addition, the output data to be transmitted is organized into the data format including only the data fields of the data type specified in the data shaping rule instead of the data including the data fields of all data types, thereby achieving the shaping into the output data of a reduced data amount (shaped data). In brief, the data shaping section 230 performs control such that the transmission data to be uploaded to the monitor control apparatus 300 is reduced in number as compared with the output data pieces from the data source node 100 and/or in data amount as compared with the output data from the data source node 100.

Alternatively, the data shaping processing can include extracting predetermined output data pieces from sequential time-series output data pieces of the data source node 100 and shaping the extracted output data pieces into a data format including all data types. Output data which is not to be transmitted is discarded, so that the number of output data pieces to be transmitted to the monitor control apparatus 300 can be reduced. Alternatively, the data shaping processing can include extracting all sequential time-series output data pieces of the data source node 100 and shaping those output data pieces into a data format including only the data fields of a data type specified in the data shaping rule. This can achieve the shaping into the output data of a reduced data amount (shaped data).

Although the data shaping processing with the threshold value has been described in which the output data indicating a CPU utilization rate of 80% or higher is extracted, the present invention is not limited thereto. For example, data shaping processing may be performed by calculating an average value or a deviation of output data acquired in a given time period to obtain a single data piece calculated from a plurality of sequential time-series output data pieces. For example, the data shaping section 230 calculates an average value of CPU utilization rates in sequential time-series output data pieces input to the data shaping section 230 in a given time period and discards those output data pieces without transmission to the monitor control apparatus 300. Then, the data shaping section 230 can output the calculated average value the data transmission section 240 to transmit only the average value to the monitor control apparatus 300. Similarly to the above case, the number of output data pieces transmitted to the monitor control apparatus 300 can be reduced, and the amount of output data (shaped data) transmitted to the monitor control apparatus 300 can be reduced.

The data shaping section 230 can accumulate shaped data pieces to be output to the data transmission section 240 or output data pieces not shaped, later described, for a given time period, and then compress and shape the accumulated output data pieces into one transmission data piece.

Next, description is made of a data shaping rule used and data shaping processing performed in sampling for each data source node 100. As described above, the data collection apparatus 200 according to the present embodiment performs the data shaping processing on the output data from each data source node 100 to reduce the number of output data pieces to be transmitted to the monitor control apparatus 300 or to transmit a reduced amount of output data (shaped data) to the monitor control apparatus 300.

In some cases, however, the monitor control apparatus 300 may need to see all the output data from the data source node 100 as a sample. Examples of such cases include the case where the detecting rule definition file 311 used for the phenomenon detecting processing in the monitor control apparatus 300 is reviewed, the case where a new detecting rule is established, the case where a particular phenomenon is detected in the phenomenon detecting processing by the monitor control apparatus 300 and the status of the apparatus having the associated apparatus ID needs to be found, and the case where overall changes in data from the data source node 100 need to be seen.

In those cases, instead of control in which all the output data pieces from all the data source nodes 100 are uploaded to the monitor control apparatus 300, control can be performed to use the data shaping rule information to specify a data source node 100 (apparatus ID) for sampling such that data shaping section 230 can output all the output data pieces from that data source node 100 for sampling to the data transmission section 240 before uploading to the monitor control apparatus 300.

In the example of FIG. 10, a data shaping rule ID "B006" set to the apparatus ID "A005" is an example of the data shaping rule to specify a target for sampling. The data shaping rule ID "B006" has, in the data shaping rule, "all types" for a target data type and "all output data pieces" for a target output data. The data shaping section 230 performs control to output all the output data pieces from the data source node 100 of the apparatus ID "A005" to the data transmission section 240. In other words, when the data shaping rule has "all types" for the target data type and "all output data pieces" for the target output data, the data shaping section 230 does not perform the data shaping processing described above but performs control to provide the output data to the data transmission section 240 with no change (data shaping processing for sampling).

With this configuration, all the output data pieces from the particular data source node 100 that are needed for sampling can be transmitted as sample data to the monitor control apparatus 300, whereas the output data from the data source node 100 which is not the target for sampling can be subjected to the data shaping processing described above and then uploaded to the monitor control apparatus 300. Thus, when all the output data pieces from a certain data source node 100 need to be sampled in the monitor control apparatus 300, all the output data pieces from all the data source nodes 100 are not uploaded to the monitor control apparatus 300, so that the load on the network can be reduced.

Since the target for sampling can be specified individually, the status of an apparatus having a particular apparatus ID can be found when a particular phenomenon is detected in the phenomenon detecting processing by the monitor control apparatus 300, or sampling can be performed by selecting, from the plurality of data source nodes, a data source node 100 in which a phenomenon pattern is easily recognized according to the detecting rule in the detecting rule definition file 311.

Next, the phenomenon detecting processing in the monitor control apparatus 300 is described with reference to FIG. 11. FIG. 11 is a diagram showing an example of the phenomenon detecting processing performed by taking account of output data from an apparatus having an apparatus ID for sampling.

As shown in FIG. 11, the processing differs from the processing flow in the monitor control apparatus 300 shown in FIG. 7 in that the former includes additional processing performed by the data reception section 301 not to provide the phenomenon detecting section 310 with output data from the apparatus having the apparatus ID specified for sampling. Upon reception of output data from the data collection apparatus 200, the data reception section 301 refers to the data shaping rule storage section 352 to determine whether or not the received output data is specified for sampling (S111). The data reception section 301 outputs only the output data not specified for sampling to the phenomenon detecting section 310 (NO at S112), and outputs and stores the output data specified for sampling into the collected data storage section 353 (YES at S112).

FIG. 12 is a diagram showing a processing flow in the data collection apparatus 200. As shown in FIG. 12, the data collection section 210 sequentially receives output data in chronological order from each data source node 100 (S301). The data collection section 210 outputs the sequential time-series output data received from the data source node 100 to the EP side phenomenon detecting section 220.

The EP side phenomenon detecting section 220 performs the phenomenon detecting processing of processing the output data from the data source node 100 to detect a predetermined phenomenon based on the EP side detecting rule definition information (S302). When any predetermined phenomenon is detected on the basis of the EP side detecting rule definition information (YES at S303), the EP side phenomenon detecting section 220 outputs the detecting result to the apparatus ID which provided the output data from which the phenomenon is detected (S304).

The data shaping section 230 receives the output data with no change after input to the EP side phenomenon detecting section 220 in parallel with the phenomenon detecting processing in the EP side phenomenon detecting section 220. The data shaping section 230 performs the to shaping processing on the output data from each data source node 100 based on the data shaping rule information (S305) and outputs the result to the data transmission section 240. The data transmission section 240 transmits the shaped data output from the data shaping section 230 or the output data to the monitor control apparatus 300 (S306).

FIG. 13 is a diagram showing a processing flow in the monitor control apparatus 300 and illustrating processing of setting the EP side detecting rule definition information and the data shaping rule information.

In the present embodiment, the EP side detecting rule definition information and the data shaping rule information for use in the data collection apparatus 200 are managed by the monitor control apparatus 300 and supplied from the monitor control apparatus 300 to the data collection apparatus 200.

The monitor control apparatus 300 includes the EP side detecting rule setting section 361 and the data shaping setting section 362 (see FIG. 2). The EP side detecting rule setting section 361 refers to EP side detecting rule definition information stored previously in the feedback data storage section 351, extracts EP side detecting rule definition information to be set, and outputs that information to the transmission section 302 at a predetermined time (S501). The transmission section 302 transmits the EP side detecting rule definition information to the data collection apparatus 200 (S502).

For example, as shown in FIG. 9, the feedback data storage section 351 stores the EP side detecting rule for each detecting rule ID. A new EP side detecting rule not set in the data collection apparatus 200 has a blank rule setting date. The EP side detecting rule setting section 361 can perform setting processing of extracting an EP side detecting rule having a blank rule setting date from the feedback data storage section 351 and outputting the extracted EP side detecting rule to the transmission section 302. At this point, the EP side detecting rule setting section 361 can perform control to store the current date (system date) in the rule setting date of the EP side detecting rule subjected to the setting processing.

The EP side detecting rule definition information can be set, for example on the basis of the detecting rule definition file 311. In the example of FIG. 5, since the detecting rule definition file 311 is set such that the pattern of change in data of CPU utilization rate from C to D to E is detected as a particular phenomenon, the EP side detecting rule can be set to detect output data indicating a CPU utilization rate of 80% or higher which is lower than the CPU utilization rate of 81% assigned to "C," for example.

The EP side detecting rule definition information can be updated by using a learning function of the learning control section 340. For example, action results can be stored as feedback information in the feedback data storage section 351 and can represent what countermeasure was actually performed by a system node 500 to which the action information was output, whether the action information was suitable, and whether the countermeasure was appropriately performed with the action information. The action results can be obtained through contact by telephone or fax, or a function of a computer for acquiring the feedback information. The feedback information can be stored in the feedback data storage section 351 through input performed by an operator with a keyboard or automatic acquisition.

The learning control section 340 refers to the feedback information and can determine, based on feedback information indicating that no "abnormality" was recognized even at a CPU utilization of 80% or higher, that the server apparatus and the system including the server apparatus normally operate even at a CPU utilization rate of 80% or higher, for example. The learning control section 340 can also determine, based on feedback information indicating that an "abnormality" was recognized at a CPU utilization of 90% or higher, that the server apparatus and the system including the server apparatus do not normally operate at a CPU utilization rate of 90% or higher.

The learning control section 340 can change the EP side detecting rule specifying a CPU utilization rate of 80% or higher and newly set an EP side detecting rule specifying a CPU utilization rate of 90% or higher. The newly set EP side detecting rule is stored in the feedback data storage section 351 with a blank rule setting date.

As shown in FIG. 13, the data shaping setting section 362 refers to data shaping rule information stored previously in the data shaping rule storage section 352, extracts a data shaping rule to be set, and outputs that information to the transmission section 302 at a predetermined time (S503). The transmission section 302 transmits the data shaping rule information to the data collection apparatus 200 (S504).

For example, as shown in FIG. 10, the data shaping rule storage section 352 stores the data shaping rule for each data shaping rule ID. Since a new data shaping rule not set in the data collection apparatus 200 has a blank rule setting date, the data shaping setting section 362 can perform setting processing of extracting a data shaping rule having a blank rule setting date from the data shaping rule storage section 352 and outputting the extracted data shaping rule to the transmission section 302. The data shaping setting section 362 can perform control to store the current date (system date) in the rule setting date of the data shaping rule subjected to the setting processing.

The data shaping rule information can be set, for example on the basis of the detecting rule definition file 311. In the example of FIG. 5, since the detecting rule definition file 311 is set such that the pattern of change in data of CPU utilization rate from C to D to E is detected as a particular phenomenon, the data shaping rule can be set for each data source node 100 to upload only the output data indicating a CPU utilization rate of 80% or higher which is lower than the CPU utilization rate of 81% assigned to "C" to the monitor control apparatus 300. The data shaping rule information includes the data shaping rule having "all types" for the target data type and "all output data pieces" for the target output data described above.

In contrast to the EP side detecting rule definition information, the data shaping rule information can be set arbitrarily by a manager of the monitor control apparatus 300 or the like via a predetermined input apparatus.

The monitor control apparatus 300 controls the EP side detecting rule setting section 361 and the data shaping setting section 362 to set the EP side detecting rule definition information and the data shaping rule information, respectively, in the data collection apparatus 200. However, a mismatch may occur between the EP side detecting rule and the data shaping rule. For example, when the data shaping processing includes uploading only the data indicating a CPU utilization rate of 80% or higher to the monitor control apparatus 300 but the EP side detecting rule specifies "a CPU utilization rate of 75% or higher," output data indicating a CPU utilization rate less than 80% included in the detecting result from the EP side phenomenon detecting processing is not transmitted to the monitor control apparatus 300. In this case, the monitor control apparatus 300 cannot accurately see the status of the data source node 100 producing a phenomenon detected by the data collection apparatus 200.

To address this, in the present embodiment, as shown in FIG. 13, a matching check is performed between the EP side detecting rule definition information and the data shaping rule information (S505). The matching check processing can be performed by the data shaping setting section 362.

The data shaping setting section 362 refers to the feedback data storage section 351 by using each apparatus ID included in data shaping rule information as a key to search for the associated EP side detecting rule definition information. The data shaping setting section 362 compares the apparatus ID linked to each data shaping rule stored in the data shaping rule storage section 352 with the EP side detecting rule of the same apparatus ID, and performs the matching check processing of determining whether or not the data shaping rule is set with a stricter criterion than in the EP side detecting rule (for example, a set value of the CPU utilization rate in the data shaping rule is higher than a set value of the CPU utilization rate in the EP side detecting rule).

When it is determined that the data shaping rule is set with a stricter criterion than the EP side detecting rule (NO at S506), the data shaping setting section 362 performs alert processing (S507). The alert processing can include, for example, outputting a predetermined alarm from the monitor control apparatus 300. The manager or the like of the monitor control apparatus 300 can modify the data shaping rule or modify the EP side detecting rule based on the alarm from the matching check processing, for example.

The matching check processing can also be performed on a data shaping rule not yet set. In this case, the data shaping setting section 362 can perform control such that a data shaping rule determined to be set with a stricter criterion than in the EP side detecting rule is not transmitted to the data collection apparatus 200, that is, such that the mismatched data shaping rule is not set in the data collection apparatus 200.

FIG. 14 is a diagram showing a processing flow in the data collection apparatus 200, and illustrating processing of setting the EP side detecting rule and the data shaping rule transmitted from the monitor control apparatus 300.

The data collection apparatus 200 includes the EP side detecting rule control section 250 and the data shaping rule control section 260 (see FIG. 8). Upon reception of the EP side detecting rule definition information from the monitor control apparatus 300 (YES at S701), the reception section 270 stores the information in the storage section 280 (S702) and outputs the received EP side detecting rule to the EP side detecting rule control section 250. The EP side detecting rule control section 250 sets the EP side detecting rule input thereto from the reception section 270 in the EP side phenomenon detecting section 220 (S703).

Upon reception of the data shaping rule from the monitor control apparatus 300 (YES at S704), the reception section 270 stores the information in the storage section 280 (S705) and outputs the received data shaping rule to the data shaping rule control section 260. The data shaping rule control section 260 sets the data shaping rule input thereto from the reception section 270 in the data shaping section 230 (S706).

The data shaping rule control section 260 can perform control to perform the matching check processing shown in FIG. 13 such that a data shaping rule not matched with the EP side detecting rule is not set. The EP side detecting rule control section 250 and the data shaping rule control section 260 can set the EP side detecting rule definition information and the data shaping rule received from the monitor control apparatus 300, respectively, at an arbitrary time. In this case, the received EP side detecting rule has a blank rule setting date, the EP side detecting rule control section 250 extracts and sets the EP side detecting rule having the blank rule setting date stored in the storage section 280. Similarly to the above case, the EP side detecting rule control section 250 performs control to storage the current date (system date) in the blank rule setting date in connection with the setting of the EP side detecting rule. This applies to the processing of setting the data shaping rule.

According to the present embodiment, the output data from each data source is subjected to the data shaping processing for each data source based on the data shaping rule to reduce the number of output data pieces to be transmitted to the monitor control apparatus or to transmit a reduced amount of output data to the monitor control apparatus 300, so that the load on the network (data transmission load) and the processing load in the monitor control apparatus can be reduced.

Embodiment 2

FIGS. 15 to 22 are diagrams illustrating Embodiment 2. As shown in FIG. 15, a data collection apparatus 200 according to Embodiment 2 differs from the data collection apparatus 200 according to Embodiment 1 shown in FIG. 8 in that the former includes an EP side data learning section 290. The EP side data learning section 290 performs learning processing on chronologically sequential output data input thereto from a data source node 100 via a data collection section 210 and processing of modifying an EP side detecting rule and a data shaping rule based on the learning processing.

The data collection apparatus 200 according to Embodiment 1 described above receives the EP side detecting rule and the data shaping rule produced in the monitor control apparatus 300 and sets the respective rules. In contrast, in Embodiment 2, the EP side data learning section 290 performs control for phenomenon detecting processing and data shaping processing based on the EP side detecting rule and the data shaping rule on the EP side (data collection apparatus 200 side).

The data collection apparatus 200 can set the EP side detecting rule and the data shaping rule produced in the EP side data learning section 290 independently of processing of setting the EP side detecting rule and the data shaping rule performed in the monitor control apparatus 300 for the data collection apparatus 200. The description of Embodiment 2 is mainly focused on differences from Embodiment 1, and the configuration and the processing identical to those in Embodiment 1 are designated with the same reference numerals and description thereof is omitted.

FIG. 16 is a diagram for explaining the processing of modifying the EP side detecting rule and the data shaping rule performed by the EP side data learning section 290 according to the present embodiment. Similarly to Embodiment 1, the data collection section 210 sequentially receives output data in chronological order from each data source node 100. The data collection section 210 outputs the sequential time-series output data received from the data source node 100 to the EP side data learning section 290 and an EP side phenomenon detecting section 220.

In the example of FIG. 16, the EP side data learning section 290 is provided between the data collection section 210 and the EP side phenomenon detecting section 220. The EP side phenomenon detecting section 220 receives the sequential output data from the data source node 100 via the EP side data learning section 290. In this case, similarly to the EP side phenomenon detecting section 220, the EP side data learning section 290 only refers to the sequential time-series output data input thereto from the data collection section 210 to perform the learning processing but does not perform any processing on the output data, and outputs the output data to the EP side phenomenon detecting section 220 with no change. The data collection section 210 may be configured to output the sequential time-series output data from the data source node 100 to each of the EP side phenomenon detecting section 220 and the EP side data learning section 290.

The EP side phenomenon detecting section 220 detects a predetermined phenomenon based on the detecting rule set by an EP side detecting rule control section 250 and outputs the detecting result as described above. The EP side data learning section 290 according to the present embodiment learns the sequential time-series output data from the data source node 100 and determines the necessity of any modification in the detecting rule set passively in the monitor control apparatus 300. The EP side data learning section 290 produces a new detecting rule as appropriate for the necessity of any modification in the detecting rule or selects and modifies a detecting rule previously stored in a storage section 280. Based on an instruction to modify the detecting rule output from the EP side data learning section 290, the EP side detecting rule control section 250 newly sets the detecting rule produced actively on the EP side other than the detecting rule transmitted from the monitor control apparatus 300 or actively modifies the setting of the detecting rule on the EP side regardless of an instruction from the monitor control apparatus 300 to set the detecting rule.

The EP side data learning section 290 according to the present embodiment learns the sequential time-series output data from the data source node 100 and determines the necessity of any modification in the data shaping rule set passively in the monitor control apparatus 300. The EP side data learning section 290 produces a new data shaping rule as appropriate for the necessity of any modification in the data shaping rule or selects and modifies a data shaping rule previously stored in the storage section 280. Based on an instruction to modify the data shaping rule output from the EP side data learning section 290, a data shaping rule control section 260 newly sets the data shaping rule produced actively on the EP side other than the data shaping rule transmitted from the monitor control apparatus 300 or actively modifies the setting of the data shaping rule on the EP side regardless of an instruction from the monitor control apparatus 300 to set the data shaping rule.

The EP side data learning section 290 notifies the monitor control apparatus 300 of the active modifications in the detecting rule and the data shaping rule performed in the data collection apparatus 200. The EP side data learning section 290 outputs the modified detecting rule and/or the modified data shaping rule to a data transmission section 240. The data transmission section 240 transmits those rules to the monitor control apparatus 300 over the network. The monitor control apparatus 300 receives the modified detecting rule and/or data shaping rule at a data reception section 301 and stores those rules in a FB data storage section 351 and a data shaping rule storage section 352.

Next, detailed description is made of processing of determining the presence or absence of the necessity to modify the EP side detecting rule and processing of producing (selecting) the detecting rule with reference to FIGS. 17 to 19. FIG. 17 is a diagram showing an example of chronologically sequential output data in the present embodiment.

FIG. 18 is a diagram showing an example of EP side detecting rule definition information in the present embodiment.

As shown in FIG. 18, it is assumed that a detecting rule ID "R010" is set. The detecting rule ID "R010" indicates a detecting rule transmitted from the monitor control apparatus 300 (monitor control apparatus side learning detecting rule), and for example, having a threshold CPU utilization rate of 90%. For example, when output data pieces indicating CPU utilization rates from 80% to 95% are sequentially input from a data source node 100 in a given time period, the EP side phenomenon detecting section 220 periodically determines the "presence" of phenomenon detecting based on the detecting rule ID "R010" and outputs an alert to that data source node 100 (server apparatus).

It is assumed that the operational status of the server apparatus is stabilized to reduce the CPU utilization rate over time as shown in FIG. 17. For example, when output data pieces indicating CPU utilization rates of 60% or lower are input in succession from the data source node 100 in a predetermined time period after the last alert, the output of the alert based on the detecting rule ID "R010" is stopped.

It is assumed, however, that and the operational status of the server apparatus changes to cause a sudden increase in CPU utilization rate from 50% to 80% when the output data pieces indicating CPU utilization rates of 60% or lower are input in succession. In this case, no alert is output since the EP side phenomenon detecting section 220 detects a CPU utilization rate higher than 90% based on the detecting rule of the detecting rule ID "R010."

When a gap occurs between the set detecting rule and the output data from the data source node 100 as described above, it is not possible to recognize behaviors which are not covered by the detecting rule. To address this, the EP side data learning section 290 performs modification check processing of determining whether or not a predetermined gap occurs between the output data from the data source node 100 and the detecting rule, and when it is determined that the predetermined gap occurs, determines that the detecting rule needs to be modified.

For example, the EP side data learning section 290 compares sequential output data pieces acquired in a given time period after the EP side phenomenon detecting section 220 issues an alert based on the currently set detecting rule, that is, in a given time period after the latest alert output, with the threshold value set in the detecting rule. The result of the comparison shows a gap found between the output data pieces and the threshold value in the detecting rule is a predetermined threshold gap or more, the EP side data learning section 290 determines that the detecting rule needs to be modified. For example, when the detecting rule has a threshold CPU utilization rate of 90% and the sequential output data pieces have a CPU utilization rate of around 50%, a gap of approximately 40% is present. When the threshold gap is set at 30%, the EP side data learning section 290 determines that the currently set detecting rule needs to be modified. The predetermined threshold gap can be set arbitrarily and stored previously in the storage section 280.

In determining the presence or absence of the necessity to modify the detecting rule, the EP side phenomenon detecting section 220 can determine that the detecting rule needs to be modified when a gap corresponding to the threshold gap or more occurs between all the sequential output data pieces acquired in the given time period after the last alert output and the threshold value specified in the detecting rule. Alternatively, an average value of sequential output data pieces acquired in a given time period after the latest alert output can be calculated in real time, and when a gap corresponding to the threshold gap or more occurs between the average value and the threshold value specified in the detecting rule, it can be determined that the detecting rule needs to be modified.

The learning processing on sequential output data pieces for determining the presence or absence of the necessity to modify the detecting rule may be performed regardless of the alert from the EP side phenomenon detecting section 220 such that the EP side data learning section 290 can monitor the transition of sequential output data pieces during a given time period in real time.

When the modification check processing on the EP side detecting rule results in the determination that the detecting rule needs to be modified, then the EP side data learning section 290 performs processing of setting a detecting rule after modification. The detecting rule setting processing involves producing and storing a new detecting rule into the storage section 280 and outputs a rule modification instruction to the EP side detecting rule control section 250 to apply the newly produced detecting rule to the EP side phenomenon detecting section 220.

The processing of producing the new detecting rule can be performed by changing the currently set threshold value in the detecting rule in accordance with a gap between each output data and the threshold value specified in the detecting rule. For example, as the gap becomes larger, the currently set threshold value in the detecting rule can be reduced more, and a new detecting rule can be produced in which the reduced threshold value is set. Alternatively, the threshold value can be reduced by a fixed reduction amount regardless of a gap to produce a new detecting rule. Various types of information including the reduction amount and the reduction rate necessary for the processing of producing the new detecting rule are stored in the storage section 280.

In the example of FIG. 18, the EP side data learning section 290 newly produces a detecting rule ID "R011" indicating a threshold CPU utilization rate of 80% which is applied to the EP side phenomenon detecting section 220 via the EP side detecting rule control section 250. The EP side data learning section 290 performs rule modification processing for switching to the new EP side detecting rule having the reduced threshold value in the EP side detecting rule, that is, the reduced detecting level in the EP side detecting rule. When the detecting level is reduced, it is possible to properly recognize any behavior of sequential time-series output data which cannot be detected due to the wide gap between the currently set EP side detecting rule and output data (sudden change of output data within a range below the currently set detecting level in the EP side detecting rule).

The EP side data learning section 290 can be configured to switch to a new detecting rule selected from a single or a plurality of detecting rules stored previously in the storage section 280 instead of newly produce a detecting rule. For example, the storage section 280 stores detecting rules transmitted from the monitor control apparatus 300 as described above other than the detecting rule produced on the EP side.

The monitor control apparatus 300 previously transmits a plurality of detecting patterns (monitor control apparatus side detecting patterns) to the data collection apparatus 200 for storage in the storage section 280. When it is determined that the detecting rule needs to be modified, the EP side data learning section 290 can select from the storage section 280, for example, a detecting rule having a threshold CPU utilization rate lower than that in the currently set detecting rule. The EP side data learning section 290 performs control to newly set the selected detecting rule via the EP side detecting rule control section 250.

FIG. 19 is a flow chart showing the processing of modifying the EP side detecting rule performed by the EP side data learning section 290 according to the present embodiment. As shown in FIG. 19, the EP side data learning section 290 monitors (learns) sequential output data from the data collection section 210 for each data source node 100 (S801). The EP side data learning section 290 performs the modification check processing of determining whether the predetermined gap occurs between the output data from the data source node 100 and the detecting rule (S802). The modification check processing results in the determination that the detecting rule does not need to be modified, the processing is ended (NO at S803). When determined that the detecting rule needs to be modified (YES at S803), the EP side data learning section 290 performs the processing of setting the detecting rule after modification described above.

In an example of the processing of setting the detecting rule after modification, the EP side data learning section 290 produces a new detecting rule for replacing the currently set detecting rule (S804) and stores the produced detecting rule (EP side detecting rule) in the storage section 280. The EP side data learning section 290 outputs a rule modification instruction to the EP side detecting rule control section 250 to apply the newly produced detecting rule to the EP side phenomenon detecting section 220. The EP side detecting rule control section 250 performs control to apply the newly set detecting rule to the EP side phenomenon detecting section 220 based on the rule modification instruction (S805). The EP side data learning section 290 outputs the modified detecting rule to the data transmission section 240 before transmission to the monitor control apparatus 300 over the network.

Next, detailed description is made of processing of determining the presence or absence of the necessity to modify the EP side data shaping rule and processing of producing (selecting) the data shaping rule with reference to FIGS. 20 to 22. FIGS. 20 and 21 are diagrams showing examples of data shaping rule information in the present embodiment. FIG. 22 is a flow chart showing the processing of modifying the data shaping rule performed by the EP side data learning section 290 in the present embodiment.

As described above, the data shaping section 230 performs the data shaping processing on the output data from each data source node 100 and performs control to reduce the number of output data pieces to be transmitted to the monitor control apparatus 300 or to transmit a reduced amount of output data (shaped data) to the monitor control apparatus 300.

The data shaping section 230 performs the data shaping processing on the output data for each data source node based on the data shaping rule. In the present embodiment, similarly to the detecting rule, the EP side data learning section 290 modifies the data shaping rule and controls the data shaping processing.

FIG. 20 shows an example of the data shaping rule in which an average value of output data pieces acquired in a given time period is calculated to obtain a single data piece (shaped data) calculated from a plurality of sequential time-series output data pieces. In the example of FIG. 20, an interval period means a data shaping cycle for sequential output data pieces, and for example, corresponds to an interval during which the output data pieces are acquired to calculate the average value. The interval period can be set at an arbitrary period (time) such as one second, five seconds, ten seconds or the like. In this case, as the interval period becomes longer, a smaller amount of output data (shaped data) is transmitted to the monitor control apparatus 300.

The modification check processing on the data shaping rule involves finding a change amount of sequential time-series output data pieces during the interval period and determining whether the change amount of sequential time-series data pieces is small or almost constant. For example, if the change amount of output data pieces during the interval period is large, the change in output data pieces seems to be lost in shaped data after data shaping to cause difficulty in accurately recognizing the change in sequential time-series output data when the interval period is long. In contrast, if the change amount of output data pieces during the interval period is small, the change in output data pieces does not seem to be lost in shaped data after data shaping to allow accurate recognition of the change in sequential time-series data even when the interval period is long.

Thus, the EP side data learning section 290 monitors (learns) the change amount of sequential time-series output data pieces, and if the change amount of output data pieces during the interval period is smaller than a predetermined threshold value, switches to a data shaping rule having a longer interval period and controls the data shaping processing.

As shown in FIG. 21, another example of the interval period is the sample size used in calculating the average value. In other words, the number of output data pieces (sample size) used for calculating the average value can be used as the interval period. In this case, if the set sample size for calculating the average value (the amount of data input from the data source node 100 necessary for the data shaping processing) is large, the change in output data pieces seems to be lost in shaped data after data shaping to cause difficulty in accurately recognizing the change in sequential time-series output data. In contrast, if the set sample size is small, the amount of data (the number of shaped data pieces) to be transmitted to the monitor control apparatus 300 is increased as compared with the case when the sample size is large.

Thus, the EP side data learning section 290 monitors (learns) the change amount of sequential time-series output data pieces, and if the change amount of output data pieces is smaller than a predetermined threshold value, switches to a data shaping rule having a larger sample size and controls the data shaping processing, thereby allowing a smaller amount of output data (shaped data) to be transmitted to the monitor control apparatus 300.

As shown in FIG. 20, it is assumed that a data shaping rule ID "B100" is set. The data shaping rule ID "B100" indicates a data shaping rule transmitted from the monitor control apparatus 300 (monitor control apparatus side learning data shaping rule). The data shaping section 230 shapes sequential time-series output data input thereto from the data source node 100 based on the data shaping rule "B100" and outputs the shaped data to the data transmission section 240.

The EP side data learning section 290 monitors the change amount of sequential output data input thereto from the data source node 100 and performs the modification check processing on the data shaping rule in the data shaping processing in which the data shaping rule ID "B100" is applied.

The EP side data learning section 290 monitors a plurality of output data pieces during "one second" corresponding to the interval period in the data shaping rule ID "B100," and for example, sequentially compares two adjacent time-series output data pieces within one interval period, and calculates the difference between them as a change amount. The EP side data learning section 290 determines whether each change amount between those two output data pieces within one interval period is smaller than the predetermined threshold value or not, and when it is determined that it is smaller, determines that the change amount during the interval period is "Low." The EP side data learning section 290 calculates the change amount between output data pieces in each of successive interval periods from a plurality of sequential time-series output data pieces. The EP side data learning section 290 can determine that the data shaping rule needs to be modified when a predetermined number of interval periods determined to have the change amount of "Low" occur in succession.

In another example, regardless of the interval period, it is determined whether each change amount between output data pieces within a predetermined time period is smaller than a predetermined threshold value or not, and when it is determined that it is smaller, the EP side data learning section 290 can determine that the data shaping rule needs to be modified.

Next, the EP side data learning section 290 performs the processing of setting the data shaping rule after modification when it is determined that the data shaping rule needs to be modified. The processing of setting the data shaping rule involves producing and storing a new data shaping rule into the storage section 280 and outputs a rule modification instruction to the data shaping rule control section 260 to apply the newly produced data shaping rule to the data shaping section 230.

In the example of FIG. 20, the processing of producing the new data shaping rule includes producing a new data shaping rule having an interval period longer than the currently set interval period in the currently set data shaping rule ID "B100." For example, a predetermined value set in advance can be added to the interval period set in the data shaping rule ID "B100" to calculate a new interval period, thereby producing the new data shaping rule. The predetermined value added to the interval period is stored in the storage section 280.

In the example of FIG. 20, the EP side data learning section 290 newly produces a data shaping rule ID "B101" having an interval period of "10 seconds" and the new data shaping rule is applied to the data shaping section 230 via the data shaping rule control section 260.

Similarly to the detecting rule, the EP side data learning section 290 can be configured not to produce the new data shaping rule but to select a data shaping rule having an interval period longer than the interval period set in the data shaping rule ID "B100" from a single or a plurality of data shaping rules stored previously in the storage section 280 (data shaping rules transmitted from the monitor control apparatus 300 or data shaping rules produced by the EP side data learning section 290).

In the example of FIG. 21, the processing of producing the new data shaping rule includes producing a new data shaping rule having a sample size larger than the currently set sample size in the currently set data shaping rule ID "B200." For example, a predetermined value set in advance can be added to the sample size set in the data shaping rule ID "B200" to calculate a new sample size, thereby producing the new data shaping rule. The predetermined value added to the sample size is stored in the storage section 280.

In the example of FIG. 21, the EP side data learning section 290 newly produces a data shaping rule ID "B201" having a sample size of "1000" and the new data shaping rule is applied to the data shaping section 230 via the data shaping rule control section 260. Similarly to the above case, the EP side data learning section 290 can be configured not to produce the new data shaping rule but to select a data shaping rule having a sample size larger than the sample size set in the data shaping rule ID "B200" from a single or a plurality of data shaping rules stored previously in the storage section 280.

FIG. 22 is a flow chart showing the processing of modifying the data shaping rule performed by the EP side data learning section 290. As shown in FIG. 22, the EP side data learning section 290 monitors (learns) sequential output data from the data collection section 210 for each data source node 100 (S901). The EP side data learning section 290 performs the modification check processing on the data shaping rule of determining whether or not the change amount in sequential output data from the data source node 100 is "Low" (S902). The modification check processing results in the determination that the data shaping rule does not need to be modified, the processing is ended (NO at S903). When it is determined that the data shaping rule needs to be modified (YES at S903), the EP side data learning section 290 performs the processing of setting the data shaping rule after modification described above.

In an example of the processing of setting the data shaping rule after modification, the EP side data learning section 290 produces a new data shaping rule for replacing the currently set data shaping rule (S904) and stores the produced data shaping rule (EP side data shaping rule) in the storage section 280. The EP side data learning section 290 outputs a rule modification instruction to the EP side data shaping rule control section 260 to apply the newly produced data shaping rule to the data shaping section 230. The data shaping rule control section 260 performs control to apply the newly set data shaping rule to the data shaping section 230 based on the rule modification instruction (S905). The EP side data learning section 290 outputs the modified data shaping rule to the data transmission section 240 before transmission to the monitor control apparatus 300 over the network.

In the present embodiment, the data collection apparatus 200 includes the EP side data learning section 290, and the EP side data learning section 290 performs control to set the produced EP side detecting rule and data shaping rule independently of the processing of setting the EP side detecting rule and the data shaping rule in the monitor control apparatus 300 for the data collection apparatus 200.

As described in Embodiment 1, control is performed to transmit a reduced amount of output data to the monitor control apparatus 300, and the monitor control apparatus 300 performs learning by using the shaped data output from the data collection apparatus 200. The data collection apparatus 200 performs learning by using the sequential time-series output data input thereto from the data source node 100 with no change. In this manner, the learning functions of the monitor control apparatus 300 and the data collection apparatus 200 realize learning environments with the different data pieces, so that the detecting rule and the data shaping rule can be produced and applied with higher level of accuracy. This allows accurate phenomenon detecting and appropriate data transmission based on the applied rules.

In addition, the learning function of the monitor control apparatus 300 can be associated with the learning function of the data collection apparatus 200 to achieve the efficient learning functions for producing and setting the detecting rule and the data shaping rule.

Each component of the data collection apparatus 200 according to the embodiments can be realized in a single or a plurality of computer apparatuses, and each of the functions can be configured as a program. For example, a program for each function can be stored on an auxiliary storage apparatus, not shown, of a computer, a control unit such as a CPU can read the program stored on the auxiliary storage apparatus to a main storage apparatus, and the program read to the main storage apparatus can be executed by the control unit to cause the single or plurality of computers to perform the function of each component of the data collection apparatus 200 according to the embodiments. Thus the single or plurality of computers on which the program for each function of the data collection apparatus 200 according to the embodiments is installed can operate as computer apparatuses (systems) which achieve each function alone or in combination. This applies to the monitor control apparatus 300.

The program may be recorded on a computer readable recording medium and provided for a computer. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses such as an integrated circuit (such as an IC chip) designed and configured specifically for the purpose of the present invention are included in the recording medium.

Although the embodiments of the present invention have been described, those embodiments are illustrative and are not intended to limit the scope of the present invention. The novel embodiments can be implemented in various other forms, and various omissions, substitutions, and modifications can be made thereto without departing from the spirit or scope of the present invention. The embodiments and their variations are encompassed within the spirit or scope of the present invention and within the invention set forth in the claims and the equivalents thereof.

DESCRIPTION OF THE REFERENCE NUMERALS

100 DATA SOURCE NODE
200 DATA COLLECTION APPARATUS
210 DATA COLLECTION SECTION
220 EP SIDE PHENOMENON DETECTING SECTION
230 DATA SHAPING SECTION
240 DATA TRANSMISSION SECTION
250 EP SIDE DETECTING RULE CONTROL SECTION
260 DATA SHAPING RULE CONTROL SECTION
270 RECEPTION SECTION
280 STORAGE SECTION
290 EP SIDE DATA LEARNING SECTION
300 MONITOR CONTROL APPARATUS
301 DATA RECEPTION SECTION
302 TRANSMISSION SECTION
310 PHENOMENON DETECTING SECTION
311 PHENOMENON DETECTING RULE DEFINITION FILE
320 STATISTICAL ANALYSIS PROCESSING SECTION
330 DETERMINATION SECTION (EVENT PROCESSING SECTION)
331 ACTION DEFINITION FILE
340 LEARNING CONTROL UNIT
351 FEEDBACK (FB) DATA STORAGE SECTION
352 DATA SHAPING RULE STORAGE SECTION
353 COLLECTED DATA STORAGE SECTION
361 EP SIDE DETECTING RULE SETTING SECTION
362 DATA SHAPING SETTING SECTION
400 SYSTEM COOPERATION SECTION
500 SYSTEM NODE

The invention claimed is:

1. A monitor control system comprising a monitor control apparatus configured to detect a phenomenon leading to a particular result based on output data pieces output from a plurality of data sources serving as data transmission elements and a data collection apparatus configured to collect the output data pieces and to transmit the collected output data pieces to the monitor control apparatus over a network, wherein the data collection apparatus includes at least one processor configured to function as:
a data collection section configured to receive sequential time-series output data pieces output from the data source for each of the plurality of data sources;
a data shaping section configured to process the sequential time-series output data pieces for each of the data sources based on a predetermined data shaping rule set for each of the data sources to perform data shaping processing on the sequential time-series output data pieces such that the resulting data pieces are reduced in number as compared with the output data pieces output from the data source or in data amount as compared with the output data pieces output from the data source;
a data transmission section configured to transmit the output data pieces satisfying the data shaping rule obtained through the data shaping processing to the monitor control apparatus; and
a data shaping rule control section configured to receive the data shaping rule set for each of the data sources from the monitor control apparatus and to set the received data shaping rule in the data shaping section, wherein the data shaping rule includes a sampling rule for transmitting all the sequential time-series output data pieces output from the data source to the monitor control apparatus, wherein the data shaping section is configured to perform data shaping processing for sampling including outputting sequential time-series output data pieces from the data source to the data transmission section with no change, the sampling rule being set for the sequential time-series output data pieces, and to perform the data shaping processing on sequential time-series output data pieces from the data source, a data shaping rule other than the sampling rule being set for the sequential time-series output data pieces, wherein the monitor control apparatus includes at least one processor configured to function as:
a data reception section configured to receive the output data pieces transmitted from the data collection apparatus over the network;
a phenomenon detecting section configured to detect the phenomenon leading to the particular result from the output data pieces received from the data collection apparatus based on detecting rule definition data previously specifying a change attribute of the output data pieces associated with the phenomenon leading to the particular result; and
a storage section configured to store the data shaping rule, and wherein the data reception section refers to the data shaping rule to perform control such that the output data pieces from the data source for which the sampling rule is set is not output to the phenomenon detecting section and the output data pieces from the data source for which the data shaping rule other than the sampling rule is set is output to the phenomenon detecting section.

2. The monitor control system according to claim 1, wherein
the data shaping section is configured to perform the data shaping processing of arithmetically processing the sequential time-series output data pieces collected in a time period to produce a calculated value based on the data shaping rule, and
the data transmission section is configured to transmit the produced calculated value to the monitor control apparatus instead of the sequential time-series output data pieces collected in the time period.

3. The monitor control system according to claim 1, wherein the at least one processor of the data collection apparatus is further configured to function as a data learning section configured to:
learn the sequential time-series output data pieces output from the data source,
determine whether the set data shaping rule should be modified or not based on a change in the sequential output data pieces output from the data source, and
perform rule modification processing of switching to a new data shaping rule causing a reduction in number of output data pieces output from the data source or a reduction in in data amount of output data pieces output from the data source as compared with the data shaping processing based on the set data shaping rule.

4. The monitor control system according to claim 3, wherein
the at least one processor of the data collection apparatus is further configured to perform as:
an endpoint side phenomenon detecting section configured to perform endpoint side phenomenon detecting processing of processing the sequential time-series output data for each of the data sources based on a predetermined endpoint side detecting rule set for each of the data sources to detect a predetermined phenomenon; and
an endpoint side detecting rule control section configured to receive the endpoint side detecting rule set for each of the data sources from the monitor control apparatus and to set the received endpoint side detecting rule in the endpoint side phenomenon detecting section, and
the data learning section is configured to perform rule modification processing of determining whether the set endpoint side detecting rule should be modified or not based on a gap between a detecting level of the endpoint side detecting rule and the output data output from the data source and switching to a new endpoint side detecting rule in which the detecting level is reduced.

5. A data collection apparatus configured to collect output data pieces output from a plurality of data sources serving as data transmission elements and to transmit the collected output data pieces to a monitor control apparatus configured to detect a phenomenon leading to a particular result over a network, comprising:
at least one processor configured to function as:
a data collection section configured to receive sequential time-series output data pieces output from the data source for each of the plurality of data sources;
a data shaping section configured to process the sequential time-series output data pieces for each of the data sources based on a predetermined data shaping rule set for each of the data sources and to perform data shaping processing on the sequential time-series output data pieces such that the resulting data pieces are reduced in number as compared with the output data pieces output from the data source or in data amount as compared with the output data pieces output from the data source; and
a data transmission section configured to transmit the output data pieces satisfying the data shaping rule obtained through the data shaping processing to the monitor control apparatus, wherein
the data shaping rule includes a sampling rule for transmitting all the sequential time-series output data pieces output from the data source to the monitor control apparatus and the data shaping rule other than the sampling rule being subjected to the data shaping processing,
the data shaping section is configured to perform outputting sequential time-series output data pieces from the data source for which the sample rule is set to the data transmission section with no change, and to perform the data shaping processing on sequential time-series output data pieces from the data source, the data shaping rule other than the sampling rule being set for the sequential time-series output data pieces, and
the sample rule is information for determining whether or not the output data is specified as a sample object that is not output to a phenomenon detecting section configured to detect the phenomenon in the monitor control apparatus.

6. The data collection apparatus according to claim 5, wherein the at least one processor is further configured to function as a data learning section configured to:
learn the sequential time-series output data pieces output from the data source,
determine whether the set data shaping rule should be modified or not based on a change in the sequential output data pieces output from the data source, and
perform rule modification processing of switching to a new data shaping rule causing a reduction in number of output data pieces output from the data source or a reduction in in data amount of output data pieces output from the data source as compared with the data shaping processing based on the set data shaping rule.

7. The data collection apparatus according to claim 6, further comprising:
an endpoint side phenomenon detecting section configured to perform endpoint side phenomenon detecting processing of processing the sequential time-series output data for each of the data sources based on a predetermined endpoint side detecting rule set for each of the data sources to detect a predetermined phenomenon; and
an endpoint side detecting rule control section configured to receive the endpoint side detecting rule set for each of the data sources from the monitor control apparatus and to set the received endpoint side detecting rule in the endpoint side phenomenon detecting section,
wherein the data learning section is configured to perform rule modification processing of determining whether the set endpoint side detecting rule should be modified or not based on a gap between a detecting level of the endpoint side detecting rule and the output data output from the data source and switching to a new endpoint side detecting rule in which the detecting level is reduced.

8. A monitor control system comprising a monitor control apparatus configured to detect a phenomenon leading to a particular result based on output data pieces output from a plurality of data sources serving as data transmission elements and a data collection apparatus configured to collect the output data pieces and to transmit the collected output data pieces to the monitor control apparatus over a network,
  wherein the data collection apparatus includes at least one processor configured to function as:
    a data collection section configured to receive sequential time-series output data pieces output from the data source for each of the plurality of data sources;
    a data shaping section configured to process the sequential time-series output data pieces for each of the data sources based on a predetermined data shaping rule set for each of the data sources to perform data shaping processing on the sequential time-series output data pieces such that the resulting data pieces are reduced in number as compared with the output data pieces output from the data source or in data amount as compared with the output data pieces output from the data source;
    a data transmission section configured to transmit the output data pieces satisfying the data shaping rule obtained through the data shaping processing to the monitor control apparatus;
    a data shaping rule control section configured to receive the data shaping rule set for each of the data sources from the monitor control apparatus and to set the received data shaping rule in the data shaping section;
    a data learning section configured to:
      learn the sequential time-series output data pieces output from the data source,
      determine whether the set data shaping rule should be modified or not based on a change in the sequential output data pieces output from the data source, and
      perform rule modification processing of switching to a new data shaping rule causing a reduction in number of output data pieces output from the data source or a reduction in in data amount of output data pieces output from the data source as compared with the data shaping processing based on the set data shaping rule;
    an endpoint side phenomenon detecting section configured to perform endpoint side phenomenon detecting processing of processing the sequential time-series output data for each of the data sources based on a predetermined endpoint side detecting rule set for each of the data sources to detect a predetermined phenomenon; and
    an endpoint side detecting rule control section configured to receive the endpoint side detecting rule set for each of the data sources from the monitor control apparatus and to set the received endpoint side detecting rule in the endpoint side phenomenon detecting section, and
  wherein the data learning section is configured to perform rule modification processing of determining whether the set endpoint side detecting rule should be modified or not based on a gap between a detecting level of the endpoint side detecting rule and the output data output from the data source and switching to a new endpoint side detecting rule in which the detecting level is reduced.

9. A data collection apparatus configured to collect output data pieces output from a plurality of data sources serving as data transmission elements and to transmit the collected output data pieces to a monitor control apparatus configured to detect a phenomenon leading to a particular result over a network, comprising:
  at least one processor configured to function as:
  a data collection section configured to receive sequential time-series output data pieces output from the data source for each of the plurality of data sources;
  a data shaping section configured to process the sequential time-series output data pieces for each of the data sources based on a predetermined data shaping rule set for each of the data sources and to perform data shaping processing on the sequential time-series output data pieces such that the resulting data pieces are reduced in number as compared with the output data pieces output from the data source or in data amount as compared with the output data pieces output from the data source;
  a data transmission section configured to transmit the output data pieces satisfying the data shaping rule obtained through the data shaping processing to the monitor control apparatus;
  a data learning section configured to:
    learn the sequential time-series output data pieces output from the data source,
    determine whether the set data shaping rule should be modified or not based on a change in the sequential output data pieces output from the data source, and
    perform rule modification processing of switching to a new data shaping rule causing a reduction in number of output data pieces output from the data source or a reduction in in data amount of output data pieces output from the data source as compared with the data shaping processing based on the set data shaping rule;
  an endpoint side phenomenon detecting section configured to perform endpoint side phenomenon detecting processing of processing the sequential time-series output data for each of the data sources based on a predetermined endpoint side detecting rule set for each of the data sources to detect a predetermined phenomenon; and
  an endpoint side detecting rule control section configured to receive the endpoint side detecting rule set for each of the data sources from the monitor control apparatus and to set the received endpoint side detecting rule in the endpoint side phenomenon detecting section,
  wherein the data learning section is configured to perform rule modification processing of determining whether the set endpoint side detecting rule should be modified or not based on a gap between a detecting level of the endpoint side detecting rule and the output data output from the data source and switching to a new endpoint side detecting rule in which the detecting level is reduced.

* * * * *